United States Patent
Hoffert et al.

(10) Patent No.: US 9,654,531 B2
(45) Date of Patent: *May 16, 2017

(54) SYSTEM AND METHOD FOR TRANSITIONING BETWEEN RECEIVING DIFFERENT COMPRESSED MEDIA STREAMS

(71) Applicant: Spotify AB, Stockholm (SE)

(72) Inventors: Eric Hoffert, South Orange, NJ (US); Ludvig Strigeus, Gothenburg (CN); Andreas Oman, Stockholm (SE); Oskar Arvidsson, Trångsund (SE)

(73) Assignee: SPOTIFY AB, Stockholm (SE)

( * ) Notice: Subject to any disclaimer, the term of this patent is extended or adjusted under 35 U.S.C. 154(b) by 475 days.

This patent is subject to a terminal disclaimer.

(21) Appl. No.: 14/133,352

(22) Filed: Dec. 18, 2013

(65) Prior Publication Data

US 2015/0039781 A1    Feb. 5, 2015

Related U.S. Application Data

(60) Provisional application No. 61/861,330, filed on Aug. 1, 2013.

(51) Int. Cl.
*H04L 29/06* (2006.01)
*H04N 21/434* (2011.01)
(Continued)

(52) U.S. Cl.
CPC .......... *H04L 65/60* (2013.01); *H04L 65/4084* (2013.01); *H04L 65/604* (2013.01);
(Continued)

(58) Field of Classification Search
CPC ....... H04N 21/23406; H04N 21/64307; H04N 21/4347; H04N 21/4384; H04N 21/44016;
(Continued)

(56) References Cited

U.S. PATENT DOCUMENTS

| | | | |
|---|---|---|---|
| 5,682,207 A | 10/1997 | Takeda et al. | |
| 5,896,128 A | 4/1999 | Boyer | |

(Continued)

FOREIGN PATENT DOCUMENTS

| | | | |
|---|---|---|---|
| EP | 1672923 A1 | 6/2006 | |
| EP | 1775953 A1 | 4/2007 | |

(Continued)

OTHER PUBLICATIONS

Hoffert, Office Action U.S. Appl. No. 14/165,513, Mar. 18, 2016, 17 pgs.

(Continued)

*Primary Examiner* — Benjamin R Bruckart
*Assistant Examiner* — Tien M Nguyen
(74) *Attorney, Agent, or Firm* — Morgan, Lewis & Bockius LLP

(57) ABSTRACT

A computer system receives a first compressed media stream and stores corresponding data in a first compressed buffer. The computer system generates a first decompressed media stream based on the first compressed media stream. While providing the first decompressed media stream to a presentation device, the computer system receives a content-transition indication indicating that a second decompressed media stream is to be provided to the presentation device instead of the first decompressed media stream. While continuing to generate the first decompressed media stream using the first compressed buffer, the computer system receives a second compressed media stream corresponding to the second decompressed media stream and stores corresponding data in a second compressed buffer. After storing the data in the second compressed buffer, the computer system provides a second decompressed media stream, based on the second compressed media stream, to the (Continued)

presentation device instead the first decompressed media stream.

19 Claims, 17 Drawing Sheets

(51) Int. Cl.
H04N 21/44 (2011.01)
H04N 21/4405 (2011.01)
H04N 21/442 (2011.01)
H04N 21/2343 (2011.01)
H04N 21/438 (2011.01)

(52) U.S. Cl.
CPC .......... *H04L 65/605* (2013.01); *H04L 65/607* (2013.01); *H04L 65/80* (2013.01); *H04N 21/23439* (2013.01); *H04N 21/4347* (2013.01); *H04N 21/4384* (2013.01); *H04N 21/4405* (2013.01); *H04N 21/44008* (2013.01); *H04N 21/44016* (2013.01); *H04N 21/44209* (2013.01); *H04L 69/04* (2013.01)

(58) Field of Classification Search
CPC ........... H04N 21/44209; H04N 21/426; H04N 21/43; H04N 21/433; H04N 21/44004; H04N 21/44008; H04N 21/44012
See application file for complete search history.

(56) References Cited

U.S. PATENT DOCUMENTS

| | | | |
|---|---|---|---|
| 6,208,354 B1 | 3/2001 | Porter | |
| 6,384,869 B1 | 5/2002 | Sciammarella et al. | |
| 6,590,618 B1 | 7/2003 | Park et al. | |
| 6,671,453 B2 | 12/2003 | Yagura et al. | |
| 6,804,824 B1 | 10/2004 | Potrebic et al. | |
| 6,919,929 B1 | 7/2005 | Iacobelli et al. | |
| 7,165,050 B2 | 1/2007 | Marking | |
| 7,519,223 B2 | 4/2009 | Dehlin et al. | |
| 7,797,713 B2 | 9/2010 | Dawson et al. | |
| 8,146,019 B2 | 3/2012 | Kim et al. | |
| 8,214,619 B1 | 7/2012 | Connolly | |
| 8,340,654 B2 | 12/2012 | Bratton et al. | |
| 8,341,662 B1 | 12/2012 | Bassett et al. | |
| 8,341,681 B2 | 12/2012 | Walter et al. | |
| 8,434,006 B2 | 4/2013 | Profitt | |
| 8,532,464 B2 | 9/2013 | Randall | |
| 8,564,728 B2 | 10/2013 | Petersson et al. | |
| 8,606,954 B1 | 12/2013 | Abidogun et al. | |
| 8,683,377 B2 | 3/2014 | Zuverink et al. | |
| 8,736,557 B2 | 5/2014 | Chaudhri | |
| 8,908,110 B2 | 12/2014 | Yamashita et al. | |
| 9,032,412 B1 | 5/2015 | Davidson | |
| 9,071,798 B2 | 6/2015 | Hoffert et al. | |
| 2001/0003846 A1 | 6/2001 | Rowe et al. | |
| 2001/0030660 A1 | 10/2001 | Zainoulline | |
| 2002/0089587 A1 | 7/2002 | White | |
| 2002/0116701 A1* | 8/2002 | Asada | G06F 8/61 717/168 |
| 2004/0003399 A1 | 1/2004 | Cooper | |
| 2004/0056885 A1 | 3/2004 | Azami et al. | |
| 2004/0221306 A1 | 11/2004 | Noh | |
| 2004/0261127 A1* | 12/2004 | Freeman | G03C 1/26 725/135 |
| 2005/0114885 A1 | 5/2005 | Shikata et al. | |
| 2005/0138658 A1 | 6/2005 | Bryan | |
| 2005/0234992 A1 | 10/2005 | Haberman | |
| 2006/0015904 A1 | 1/2006 | Marcus | |
| 2006/0061688 A1 | 3/2006 | Choi | |
| 2006/0075428 A1 | 4/2006 | Farmer et al. | |
| 2006/0155952 A1 | 7/2006 | Haas et al. | |
| 2006/0159184 A1 | 7/2006 | Jang | |
| 2006/0218250 A1 | 9/2006 | Nakase | |
| 2006/0245605 A1 | 11/2006 | Matsunaga | |
| 2006/0259877 A1 | 11/2006 | Kaminagayoshi | |
| 2006/0282864 A1 | 12/2006 | Gupte | |
| 2007/0028270 A1 | 2/2007 | Ostojic et al. | |
| 2007/0067815 A1 | 3/2007 | Bowen et al. | |
| 2007/0083911 A1 | 4/2007 | Madden et al. | |
| 2007/0169156 A1 | 7/2007 | Zeng | |
| 2007/0263066 A1 | 11/2007 | Henning et al. | |
| 2008/0056273 A1 | 3/2008 | Pelletier et al. | |
| 2008/0074550 A1 | 3/2008 | Park | |
| 2008/0126294 A1 | 5/2008 | Ray | |
| 2008/0126919 A1 | 5/2008 | Uskali et al. | |
| 2008/0155459 A1 | 6/2008 | Ubillos | |
| 2008/0242280 A1 | 10/2008 | Shapiro et al. | |
| 2008/0244092 A1 | 10/2008 | Kosaka | |
| 2009/0010324 A1 | 1/2009 | Yamamoto | |
| 2009/0046545 A1 | 2/2009 | Blinnikka | |
| 2009/0055506 A1 | 2/2009 | Hudson et al. | |
| 2009/0100380 A1 | 4/2009 | Gardner et al. | |
| 2009/0119594 A1 | 5/2009 | Hannuksela | |
| 2009/0132599 A1 | 5/2009 | Soroushian et al. | |
| 2009/0195515 A1 | 8/2009 | Lee | |
| 2009/0198827 A1* | 8/2009 | Hughes | H04N 7/17318 709/231 |
| 2009/0234967 A1 | 9/2009 | Yu et al. | |
| 2009/0235170 A1 | 9/2009 | Golden | |
| 2009/0297123 A1 | 12/2009 | Virdi et al. | |
| 2010/0049864 A1 | 2/2010 | Lu | |
| 2010/0066918 A1 | 3/2010 | Gupta et al. | |
| 2010/0077441 A1 | 3/2010 | Thomas et al. | |
| 2010/0153999 A1 | 6/2010 | Yates | |
| 2010/0162180 A1 | 6/2010 | Dunnam et al. | |
| 2010/0175026 A1 | 7/2010 | Bortner et al. | |
| 2010/0180297 A1 | 7/2010 | Levine et al. | |
| 2010/0191859 A1 | 7/2010 | Raveendran | |
| 2010/0235733 A1 | 9/2010 | Drislane et al. | |
| 2010/0235746 A1 | 9/2010 | Anzures | |
| 2010/0287586 A1 | 11/2010 | Walter et al. | |
| 2010/0306401 A1* | 12/2010 | Gilson | H04N 5/765 709/231 |
| 2010/0332453 A1 | 12/2010 | Prahlad | |
| 2011/0029874 A1 | 2/2011 | Profitt | |
| 2011/0066703 A1 | 3/2011 | Kaplan et al. | |
| 2011/0090402 A1 | 4/2011 | Huntington et al. | |
| 2011/0119611 A1 | 5/2011 | Ahn et al. | |
| 2011/0119711 A1 | 5/2011 | Marshall et al. | |
| 2011/0119712 A1 | 5/2011 | Choi et al. | |
| 2011/0242002 A1 | 10/2011 | Kaplan et al. | |
| 2011/0252183 A1 | 10/2011 | Cho | |
| 2011/0289139 A1 | 11/2011 | Mcintosh et al. | |
| 2011/0289534 A1 | 11/2011 | Jordan et al. | |
| 2011/0296351 A1 | 12/2011 | Ewing, Jr. et al. | |
| 2012/0030619 A1 | 2/2012 | Lee et al. | |
| 2012/0054679 A1 | 3/2012 | Ma et al. | |
| 2012/0079429 A1 | 3/2012 | Stathacopoulos et al. | |
| 2012/0131459 A1 | 5/2012 | Ilama-Vaquero et al. | |
| 2012/0137216 A1 | 5/2012 | Choi | |
| 2012/0141095 A1 | 6/2012 | Schwesinger et al. | |
| 2012/0158802 A1 | 6/2012 | Lakshmanan | |
| 2012/0170903 A1 | 7/2012 | Shirron et al. | |
| 2012/0180090 A1 | 7/2012 | Yoon et al. | |
| 2012/0182384 A1 | 7/2012 | Anderson et al. | |
| 2012/0204106 A1 | 8/2012 | Hill et al. | |
| 2012/0213295 A1 | 8/2012 | Quere et al. | |
| 2012/0216117 A1 | 8/2012 | Arriola et al. | |
| 2012/0221950 A1 | 8/2012 | Chao et al. | |
| 2012/0254793 A1 | 10/2012 | Briand et al. | |
| 2012/0254926 A1 | 10/2012 | Takahashi et al. | |
| 2012/0257120 A1 | 10/2012 | Nakai | |
| 2012/0290933 A1 | 11/2012 | Rajaraman et al. | |
| 2012/0311444 A1 | 12/2012 | Chaudhri | |
| 2012/0323917 A1 | 12/2012 | Mercer et al. | |
| 2013/0016129 A1 | 1/2013 | Gossweiler, III et al. | |
| 2013/0061045 A1 | 3/2013 | Kiefer et al. | |
| 2013/0080895 A1 | 3/2013 | Rossman et al. | |
| 2013/0132605 A1 | 5/2013 | Kocks et al. | |
| 2013/0145268 A1 | 6/2013 | Kukulski | |
| 2013/0152129 A1 | 6/2013 | Alberth et al. | |
| 2013/0179925 A1 | 7/2013 | Woods et al. | |

(56) References Cited

U.S. PATENT DOCUMENTS

| | | | |
|---|---|---|---|
| 2013/0222274 A1 | 8/2013 | Mori et al. | |
| 2013/0236158 A1 | 9/2013 | Lynch et al. | |
| 2013/0263047 A1 | 10/2013 | Allen et al. | |
| 2013/0265501 A1 | 10/2013 | Murugesan et al. | |
| 2013/0275924 A1 | 10/2013 | Weinberg et al. | |
| 2013/0279375 A1 | 10/2013 | Newberg | |
| 2013/0282917 A1* | 10/2013 | Reznik | H04N 21/4402 709/231 |
| 2013/0283154 A1 | 10/2013 | Sasakura | |
| 2013/0293454 A1 | 11/2013 | Jeon et al. | |
| 2013/0305307 A1 | 11/2013 | Nagahama | |
| 2013/0307792 A1 | 11/2013 | Andres et al. | |
| 2013/0309986 A1 | 11/2013 | Cox et al. | |
| 2013/0332835 A1 | 12/2013 | Mace | |
| 2013/0346867 A1 | 12/2013 | Woods et al. | |
| 2014/0032781 A1 | 1/2014 | Casey et al. | |
| 2014/0059479 A1 | 2/2014 | Hamburg et al. | |
| 2014/0082497 A1 | 3/2014 | Chalouhi et al. | |
| 2014/0098140 A1 | 4/2014 | Tran et al. | |
| 2014/0108929 A1 | 4/2014 | Garmark et al. | |
| 2014/0114985 A1 | 4/2014 | Mok et al. | |
| 2014/0143725 A1 | 5/2014 | Lee | |
| 2014/0157124 A1 | 6/2014 | Roberts et al. | |
| 2014/0164984 A1 | 6/2014 | Farouki | |
| 2014/0173027 A1 | 6/2014 | Kappes | |
| 2014/0176479 A1 | 6/2014 | Wardenaar | |
| 2014/0178047 A1 | 6/2014 | Apodaca et al. | |
| 2014/0185466 A1* | 7/2014 | Syed | H04L 43/50 370/252 |
| 2014/0215303 A1 | 7/2014 | Grigorovitch | |
| 2014/0280433 A1 | 9/2014 | Messerli | |
| 2014/0282281 A1 | 9/2014 | Ram et al. | |
| 2015/0006662 A1 | 1/2015 | Braness | |
| 2015/0089075 A1 | 3/2015 | Strigeus | |

FOREIGN PATENT DOCUMENTS

| | | | | |
|---|---|---|---|---|
| EP | 2469841 A1 | 6/2012 | | |
| WO | WO 2004/019530 A1 | 3/2004 | | |
| WO | WO 2004019530 A1 * | 3/2004 | | H04L 29/06 |
| WO | WO 2009/088952 A1 | 7/2009 | | |
| WO | WO 2011/095693 A1 | 8/2011 | | |
| WO | WO 2013/022486 A1 | 2/2013 | | |

OTHER PUBLICATIONS

Hoffert, Final Office Action U.S. Appl. No. 14/133,340, Apr. 6, 2016, 21 pgs.
Hoffert, Office Action U.S. Appl. No. 14/134,950, Apr. 5, 2016, 17 pgs.
Hoffert, Office Action U.S. Appl. No. 14/805,323, Apr. 20, 2016, 6 pgs.
Hoffert, Office Action U.S. Appl. No. 14/743,684, Apr. 14, 2016, 7 pgs.
Hoffert, Office Action U.S. Appl. No. 14/165,518, Feb. 11, 2016, 15 pgs.
Hoffert, Office Action U.S. Appl. No. 14/133,358, Mar. 3, 2016, 21 pgs.
Hoffert, Final Office Action U.S. Appl. No. 14/165,514, Aug. 21, 2015, 20 pgs.
Hoffert, Office Action U.S. Appl. No. 14/133,333, Sep. 15, 2015, 20 pgs.
Hoffert, Office Action U.S. Appl. No. 14/133,340, Sep. 15, 2015, 19 pgs.
Strigeus, Office Action, U.S. Appl. No. 14/135,217, Aug. 26, 2015, 19 pgs.
Strigeus, Office Action, U.S. Appl. No. 14/135,230, Oct. 1, 2015, 15 pgs.
Hoffert, Office Action U.S. Appl. No. 14/165,513, Mar. 27, 2015, 16 pgs.
Hoffert, Notice of Allowance, U.S. Appl. No. 14/165,517, Apr. 28, 2015, 6 pgs.
Hoffert, Notice of Allowance U.S. Appl. No. 14/222,299, Apr. 13, 2015, 8 pgs.
ISO/IEC 14496-12, Oct. 1, 2005, International Standard, ISO/IEC, XP55178146, 94 pgs.
Siglin, "Unifying Global Video Strategies, MP4 File Fragmentation for Broadcast, Mobile and Web Delivery," A Transitions in Technology Paper, Nov. 16, 2011, 16 pgs.
Spotify AB, International Search Report and Written Opinion, PCTIB/2014/002831, Mar. 19, 2015, 11 pgs.
Spotify AB, Invitation to Pay Additional Fees and Partial Search Report, PCTIB/2014002726, Mar. 31, 2015, 8 pgs.
Zambelli, Alex, "IIS Smooth Streaming Technical Overview," Mar. 1, 2009, Microsoft Corporation, downloaded from http://dfpcorec-p.international.epo.org/wf/storage/14C3247F2EA000308DF/originalPdf, 8 pgs.
Hoffert, Office Action U.S. Appl. No. 14/165,514, Mar. 3, 2015, 19 pgs.
Hoffert, Notice of Allowance U.S. Appl. No. 14/165,512, Mar. 2, 2015, 6 pgs.
Hoffert, Notice of Allowance, U.S. Appl. No. 14/165,517, Jan. 21, 2015, 6 pgs.
Hoffert, Notice of Allowance, U.S. Appl. No. 14/165,508, Mar. 2, 2015, 5 pgs.
Hoffert, Notice of Allowance U.S. Appl. No. 14/165,507, Mar. 16, 2015, 17 pgs.
Spotify AB, International Search Report, PCTUS2014/042571, Dec. 12, 2014, 6 pgs.
Hoffert, Office Action U.S. Appl. No. 14/165,508, Jan. 5, 2015, 24 pgs.
Hoffert, Final Office Action U.S. Appl. No. 14/222,299, Nov. 28, 2014, 45 pgs.
Spotify AB, International Preliminary Report on Patentability, PCTUS2014/042571, Dec. 22, 2015, 12 pgs.
Hoffert, Final Office Action U.S. Appl. No. 14/165,508, Sep. 22. 2014, 24 pgs.
Hoffert, Final Office Action U.S. Appl. No. 14/165,514, Oct. 23, 2014, 23 pgs.
Hoffert, Final Office Action U.S. Appl. No. 14/165,513, Nov. 7, 2014, 14 pgs.
Hoffert, Notice of Allowance U.S. Appl. No. 14/165,512, Oct. 14, 2014, 5 pgs.
Hoffert, Final Office Action U.S. Appl. No. 14/165,517, Oct. 7, 2014, 7 pgs.
Hoffert, Final Office Action U.S. Appl. No. 14/165,507, Oct. 22, 2014, 20 pgs.
Spotify AB, Invitation to Pay Additional Fees and Partial ISR, PCTUS2014/042571, Sep. 24, 2014, 6 pgs.
Hoffert, Office Action U.S. Appl. No. 14/165,508, Apr. 24, 2014, 17pgs.
Hoffert, Office Action U.S. Appl. No. 14/165,514, May 9, 2014, 21 pgs.
Hoffert, Office Action U.S. Appl. No. 14/165,512, May 28, 2014, 19 pgs.
Hoffert, Office Action U.S. Appl. No. 14/165,517, May 28, 2014, 18 pgs.
Hoffert, Office Action U.S. Appl. No. 14/165,507, May 14, 2014, 18 pgs.
Hoffert, Office Action U.S. Appl. No. 14/165,513, Jun. 6, 2014, 13 pgs.
Hoffert, Office Action U.S. Appl. No. 14/222,299, Jul. 3, 2014, 35 pgs.
Hoffert, Office Action U.S. Appl. No. 14/165,514, Nov. 20, 2015, 20 pgs.
Spotify AB, International Preliminary Report on Patentability, PCTIB/2014/002831, Apr. 19, 2016, 8 pgs.
Strigeus, Final Office Action, U.S. Appl. No. 14/135,217, May 20, 2016, 11 pgs.
Hoffert, Final Office Action U.S. Appl. No. 14/165,514, Jun. 1, 2016, 21 pgs.
Hoffert, Notice of Allowance U.S. Appl. No. 14/165,518, Jun. 7, 2016, 14 pgs.
Hoffert, Final Office Action U.S. Appl. No. 14/165,513, Aug. 11, 2016, 16 pgs.

(56) References Cited

OTHER PUBLICATIONS

Hoffert, Office Action U.S. Appl. No. 14/135,225, Apr. 22, 2016, 25 pgs.
Hoffert, Office Action U.S. Appl. No. 14/720,525, Aug. 22, 2016, 17 pgs.
Hoffert, Office Action U.S. Appl. No. 14/743,694, Aug. 24, 2016, 6 pgs.
Spotify AB, Communication Pursuant to Rules 161(1) and 162, EP14828273-4, May 23, 2016, 2 pgs.
Spotify AB, Communication Pursuant to Rules 161(1) and 162, EP14831065.9, Jun. 3, 2016, 2 pgs.
Strigeus, Final Office Action, U.S. Appl. No. 14/135,230, Jun. 1, 2016, 16 pgs.
Hoffert, Notice of Allowance U.S. Appl. No. 14/134,950, Oct. 3, 2016, 10 pgs.
Hoffert, Notice of Allowance, U.S. Appl. No. 14/805,323, Oct. 3, 2016, 9 pgs.
Hoffert, Notice of Allowance, U.S. Appl. No. 14/743,684, Sep. 23, 2016, 8 pgs.
Hoffert, Final Office Action U.S. Appl. No. 14/135,225, Oct. 7, 2016, 33 pgs.
Hoffert, Notice of Allowance U.S. Appl. No. 14/165,518, Jan. 13, 2017, 17 pgs.
Hoffert, Notice of Allowance, U.S. Appl. No. 14/743,694, Dec. 19, 2016, 5 pgs.
Hoffert, Office Action U.S. Appl. No. 14/133,333, Jan. 27, 2017, 22 pgs.
Hoffert, Office Action U.S. Appl. No. 14/133,340, Jan. 18, 2017, 21 pgs.
Strigeus, Office Action, U.S. Appl. No. 14/135,217, Jan. 9, 2017, 6 pgs.
Hoffert, Notice of Allowance, U.S. Appl. No. 14/133,358, Oct. 25, 2016, 10 pgs.
Strigeus, Office Action, U.S. Appl. No. 14/135,230, Nov. 3, 2016, 15 pgs.
Hoffert, Final Office Action, U.S. Appl. No. 14/165,513, Jul. 16, 2015, 16 pgs.
Spotify AB, International Search Report and Written Opinion, PCT/IB2014/002726, Jun. 8, 2015, 20 pgs.

* cited by examiner

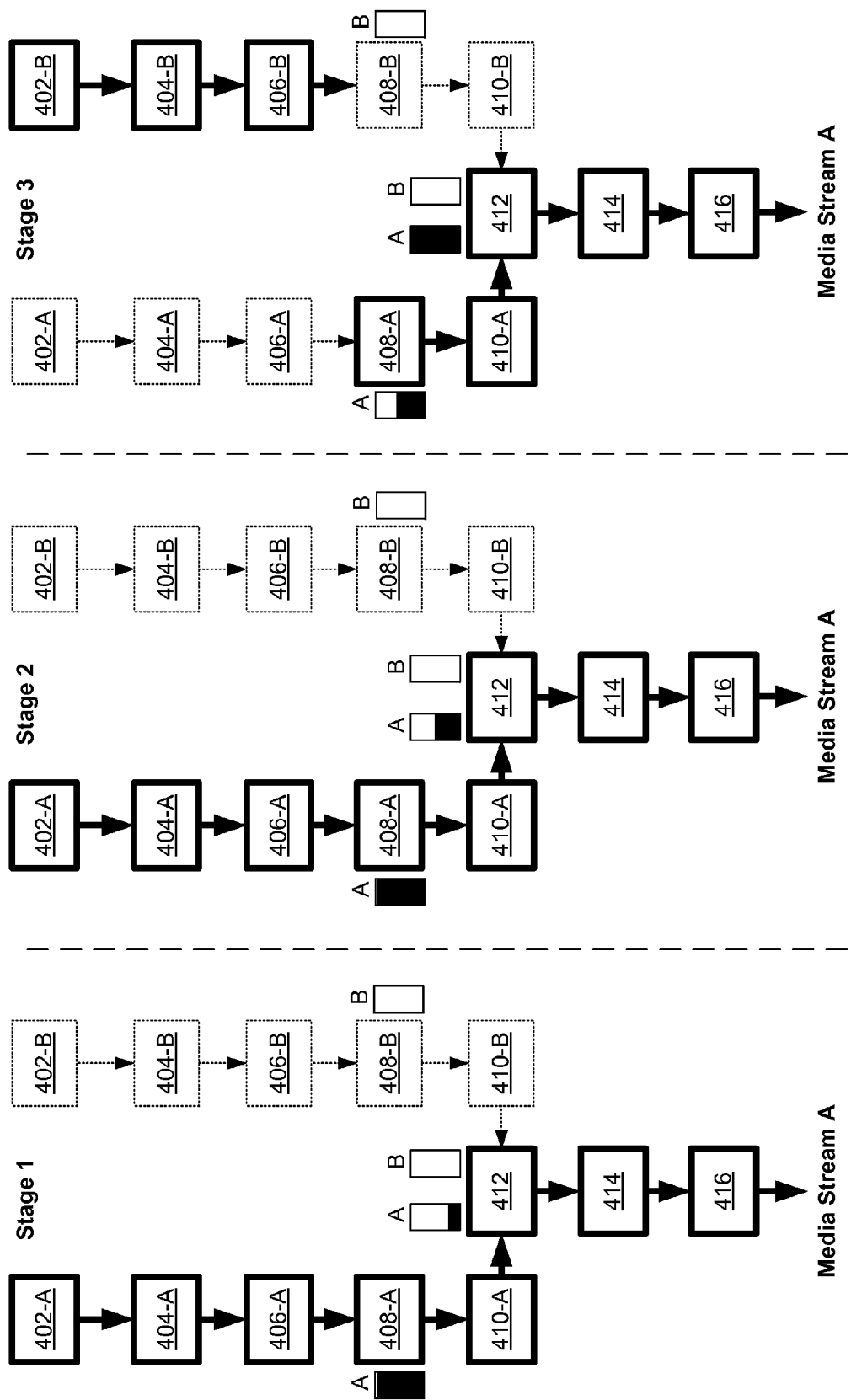

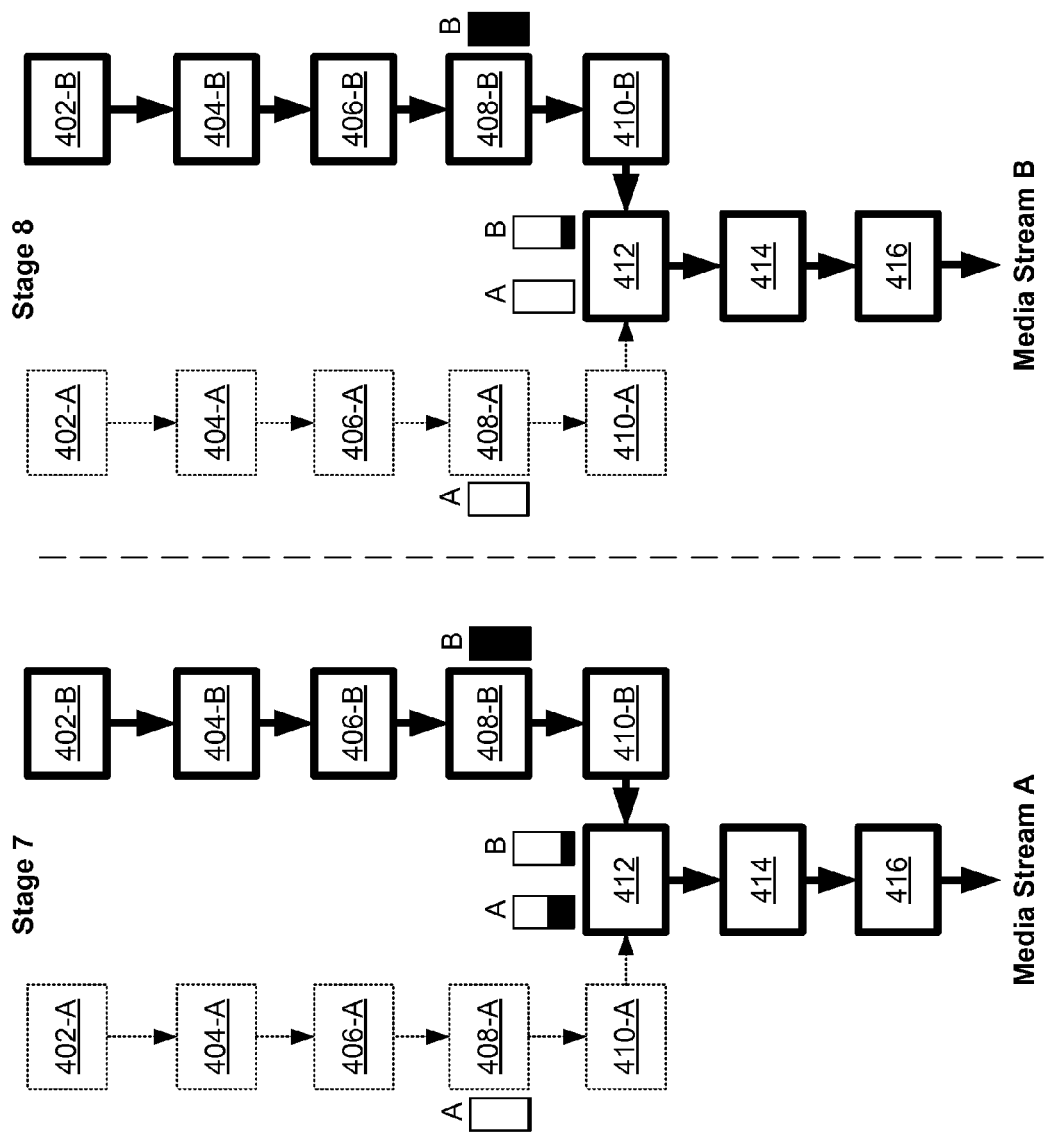

SYSTEM AND METHOD FOR TRANSITIONING BETWEEN RECEIVING DIFFERENT COMPRESSED MEDIA STREAMS

RELATED APPLICATIONS

This application claims priority to U.S. Provisional Patent Application Ser. No. 61/861,330, filed Aug. 1, 2013, entitled "Transitioning from Decompressing One Compressed Media Stream to Decompressing another Media Stream," which application is incorporated by reference in its entirety.

This application is related to U.S. Provisional Patent Application Ser. No. 61/836,079, filed Jun. 17, 2013, entitled "System and Method for Switching Between Media Streams while Providing a Seamless User Experience;" U.S. Provisional Patent Application Ser. No. 61/881,353, filed Sep. 23, 2013, entitled "System and Method for Efficiently Providing Media and Associated Metadata;" and U.S. Provisional Patent Application Ser. No. 61/892,343, filed Oct. 17, 2013, entitled "System and Method for Switching between Media Items in a Plurality of Sequences of Media Items," which applications are incorporated by reference in their entireties.

TECHNICAL FIELD

The disclosed implementations relate to decompressing compressed media content generally and transitioning between decompressing media streams in particular.

BACKGROUND

As computer technology has improved and become ubiquitous, users increasingly are able to consume media content on or through their computer based devices. For example, users can listen to audio content or watch video content on a variety of computer based electronic devices. This media content is sometimes compressed. In addition, advances in media content compression technology have increased the speed and reliability with which information can be transmitted over computer networks. As such, it is possible to stream media data over computer networks as needed rather than transmitting a file in a physical media, such as a CD or DVD, or downloading the entire file before consuming the media content.

SUMMARY

When media content is encrypted and/or compressed, it is subsequently decrypted and/or decompressed before being presented to a user; however, some solutions for streaming media that is transmitted in an encrypted and/or compressed format are cumbersome and involve excessive loading times that interfere with a user experience of streaming the media. This is especially true when attempting to transition between media streams where the device switches from decrypting and/or decompressing one media stream to decrypting and/or decompressing another media stream. Some transitions result from user selection of another media stream for presentation. Other transitions occur because the amount of bandwidth currently available at a device receiving a media stream changes. In this case, another media stream with the same media content is requested to better match the current available bandwidth. For example, if the available bandwidth decreases, a lower quality stream (e.g., a media stream with less fidelity and therefore less data to be transmitted) is requested. If the available bandwidth increases, a higher quality media stream is requested to improve the presentation quality to the user.

The decompression of a media stream is often accomplished though the use of a decoder (e.g., the decoding component of a codec that uses an algorithm for decompressing media streams). When switching between streams of media content, more than one decoder is sometimes necessary (e.g., when the different streams of media content are encoded in different formats). Running multiple decoders can strain the processing and memory resources of an electronic device, resulting in a degraded user experience. In addition, the time needed to load and run a second decoder can also degrade user experience by causing a media stream (e.g., a video stream) to pause while the second decoder loads. In such circumstances, if a user attempts to scan through several media streams (e.g., channel surfing through television channels), the user will likely experience frequent breaks in presentation of the content as the system loads the appropriate decoder.

Accordingly, there is a need for a method to transition from decompressing one compressed media stream to decompressing another media stream seamlessly even when more than one decoder is necessary to provide a seamless user experience when transitioning between different media streams. Such methods and interfaces may complement or replace conventional methods for switching between media stream channels. Such methods and interfaces enhance the user experience as the user is able to switch between media stream channels without interruption of streaming content. In particular, when switching between two media streams that include the same content but at two different bitrates, the transition can be made without interrupting media presentation. In addition, users watching live media streams (e.g., live sporting events) will be able to browse through different channels without undue delay (e.g., without being shown a "now loading" or "waiting to buffer" message and/or an icon indicating that the content is buffering such as an hourglass, spinning icon, or progress bar).

In accordance with some implementations, a method to transition from decompressing one compressed media stream to decompressing another media stream seamlessly is disclosed. The method is performed at a computer system including one or more processors and memory. The computer system generates a first decompressed media stream based on a first compressed media stream and provides the first decompressed media stream to a presentation device. While providing the first decompressed media to the presentation device, the computer system: receives a content-transition indication indicating that a second decompressed media stream is to be provided to the presentation device instead of the first decompressed media stream, stores first buffered data corresponding to the first decompressed media stream, and receives a second compressed media stream corresponding to the second decompressed media stream. After receiving the second compressed media stream, the computer system provides the first buffered data corresponding to the first decompressed media stream to the presentation device while preparing to generate the second decompressed media stream. After preparing to generate the second decompressed media stream, the computer system provides the second decompressed media stream to the presentation device instead of providing the first buffered data corresponding to the first decompressed media stream.

In accordance with some implementations, a method to transition from decompressing one compressed media stream to decompressing another media stream seamlessly is disclosed. The method is performed at a computer system including one or more processors and memory. The computer system generates a first decompressed media stream based on a first compressed media stream. The computer system provides the first decompressed media stream to a presentation device. While providing the first decompressed media stream to the presentation device, the computer system receives a content-transition indication indicating that a second decompressed media stream is to be provided to the presentation device instead of the first decompressed media stream. In response to receiving the content-transition indication, the computer system selects a first transition point in first content corresponding to the first compressed media stream and selecting a second transition point in second content corresponding to the second compressed media stream, wherein: the second transition point is selected in accordance with a bandwidth available for receiving the second compressed media stream; and the first transition point is selected based on the second transition point. The computer system requests the second compressed media stream starting at the second transition point, and generates a second decompressed media stream based on the second compressed media stream that includes content after the second transition point. After generating the second decompressed media stream, the computer system ceases to provide the first content at the first transition point (e.g., to a presentation device) and starts to provide the second content at the second transition point (e.g., to the presentation device).

In accordance with some implementations, a computer system (e.g., a client computer system or server computer system) includes one or more processors, memory, and one or more programs; the one or more programs are stored in the memory and configured to be executed by the one or more processors and the one or more programs include instructions for performing the operations of the method described above. In accordance with some implementations, a non-transitory computer readable storage medium has stored therein instructions which when executed by one or more processors, cause an computer system (e.g., a client computer system or server computer system) to perform the operations of the methods described above.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 4A-4I illustrate exemplary flow diagrams for switching between video streams in accordance with some implementations.

DETAILED DESCRIPTION

Figure 1:
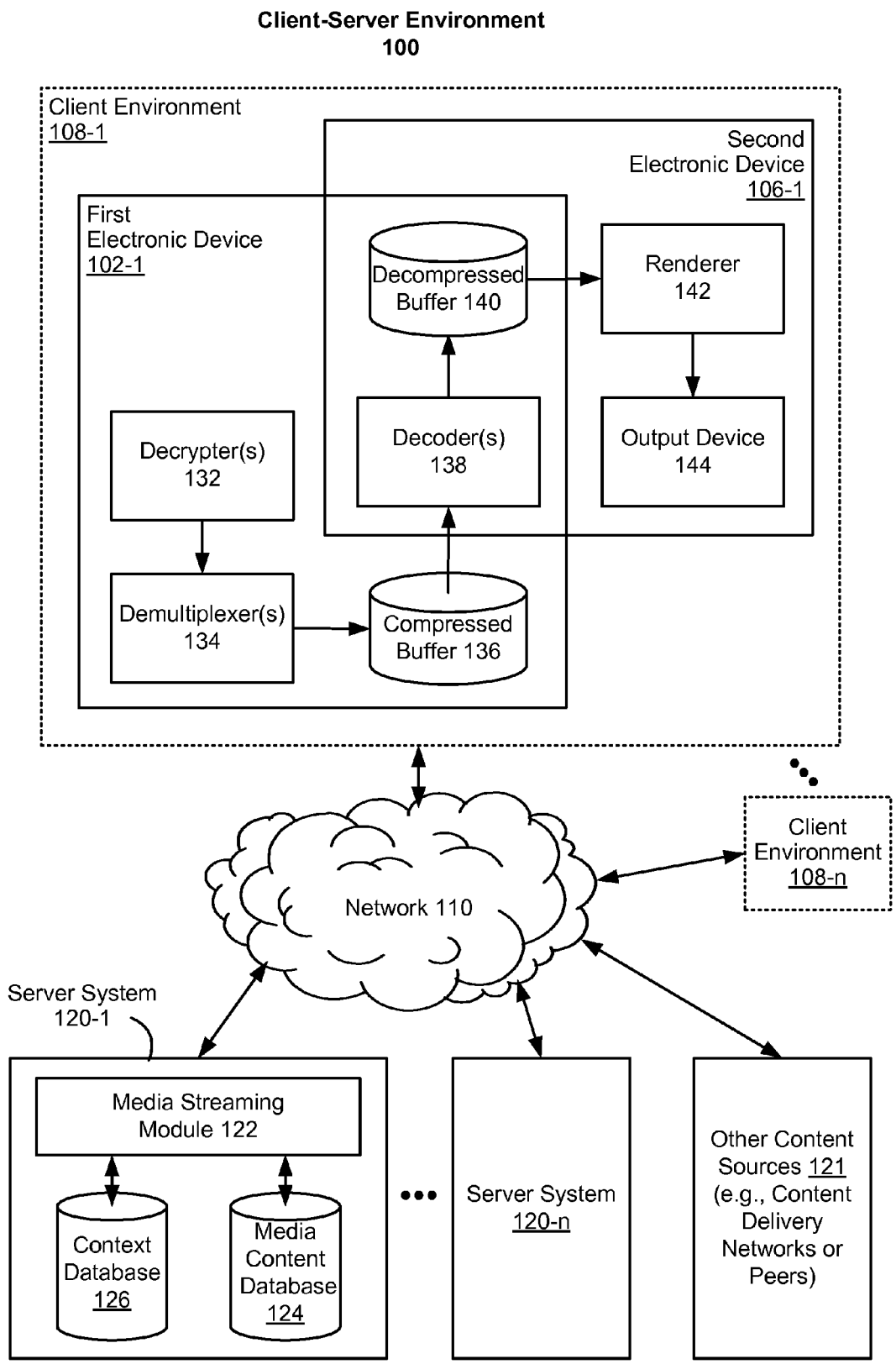
FIG. 1 is a block diagram illustrating a server client environment in accordance with some implementations.

Attention is now directed to the figures, and in particular to FIG. 1, which is a block diagram of a client-server environment, according to some implementations. The client-server environment 100 includes one or more client environments (108-1 . . . 108-n), one or more server systems (120-1 . . . 120-n), and, optionally, one or more other content sources 121 (e.g., media servers, content delivery networks or peers in a peer-to-peer network) that are connected through a network 110. In some implementations, the client environment 108-1 includes one or more electronic devices (e.g., first electronic device 102-1 and second electronic device 106-1). In some implementations, the server system 120-1 is associated with a media content provider with which users (and their electronic devices) optionally have accounts that enable the users to access media content from one of the server systems (120-1 . . . 120-n). The network 110 can be any network such as the Internet, other Wide Area Networks, Local Area Networks, Personal Area Networks, metropolitan area networks, VPNs, local peer-to-peer and/or ad-hoc connections, and so on.

In some implementations, the client environment 108-1 includes a first electronic device 102-1 (e.g., a controlling electronic device). In some implementations, the first electronic device 102-1 is one of the group of: a personal computer, a mobile electronic device, a laptop, a tablet computer, a mobile phone, a digital media player, or any other electronic device able to prepare media content for presentation, control presentation of media content, and/or present media content.

In some implementations, the client environment 108-1 also includes a second electronic device 106-1 (e.g., a controlled electronic device). In some implementations, the second electronic device 106-1 is one of the group of: a computer, an audio/visual system, a media receiver/player, television or similar display device, a discrete graphics processing unit, or any other electronic device able to present media content (e.g., display visual content and/or play audio content). In some implementations, both the first electronic device 102-1 and the second electronic device 106-1 are associated with a common user account (or associated user accounts) provided by a content provider with which the server system 120 is associated. For example, in some implementations, the server system 120 is operated and/or provided by a subscription-based media streaming service to which a user, optionally, has an account, and the first and second electronic devices 102-1, 106-1 are each associated with account credentials that enable them to communicate with and receive content from the server system 120-1. In some implementations, the first electronic device 102-1 (e.g., a personal computer or a set top box) is associated with account credentials and receives content from server system 120-1, and the second electronic device 106-1 is a media presentation device (e.g., a set of speakers, a television, etc.) that receives the content from the first electronic device 102-1 and presents that content to the user. In some embodiments, the second electronic device 106-1 is integrated with the first electronic device 102-1 (e.g., the second electronic device is a display or monitor connected to, or integrated with, an electronic device such as a laptop computer, a desktop computer, a smart phone, or a tablet computer)

In some implementations, both the first electronic device 102-1 and the second electronic device 106-1 are on the same local network. In some implementations, the first electronic device 102-1 and the second electronic device 106-1 are on different local area networks. In some implementations, the local network is a Local Area Network. In some implementations, the server system 120 is not located on the same Local Area Network as either the first electronic device 102-1 or the second electronic device 106-1.

As noted above, Local Area Networks are often associated with a relatively small geographic area (e.g., one house or building or a corporate or academic campus) and create IP address space behind a traffic routing device. In some implementations, the traffic routing device uses network address translation to connect devices within the LAN to devices outside the LAN. Network address translation is the process of readdressing packets by modifying the IP address contained in each packet so that the packets reach their intended destination device. Network address translation allows a plurality of electronic devices on the Local Area Network to connect to the Internet through a single IP address (e.g., the IP address of the traffic routing device). The traffic routing device (i.e. a router) receives incoming packets, determines which device on the Local Area Network is the intended recipient, and modifies the IP address to identify that device. For example, a Local Area Network has 5 devices with local IP addresses 192.168.0.1-192.168.0.5 that all connect to a router. The router connects to the Internet and has an IP address of 12.162.29.2. Using network address translation, the router translates the source address for all communications sent from any of the 5 devices and intended for destinations in the Internet to be 12.162.29.2 (the router's IP address). On the other hand, the router collects all packets incoming from the Internet, determines the intended recipient device based upon the contents of each packet, and translates the destination IP address to the address of the correct device on the Local Area Network. So when the intended device is the device with Local Area Network IP address 196.168.0.2, the router would change the destination address to this address. Local Area Networks also commonly use firewalls to limit incoming connections. In this way, computer devices outside of the Local Area Network are generally not able to communicate directly with the devices on a Local Area Network. Indeed, in some Local Area Networks the devices in the network are not contactable even by other devices in the Local Area Network.

In some implementations, both the first electronic device 102-1 and the second electronic device 106-1 are on the same Personal Area Network. In some implementations, the Personal Area Network uses BLUETOOTH communication technology. In some implementations, the server system 120 is not located on the same Personal Area Network as either the first electronic device 102-1 or the second electronic device 106-1.

Figure 2:
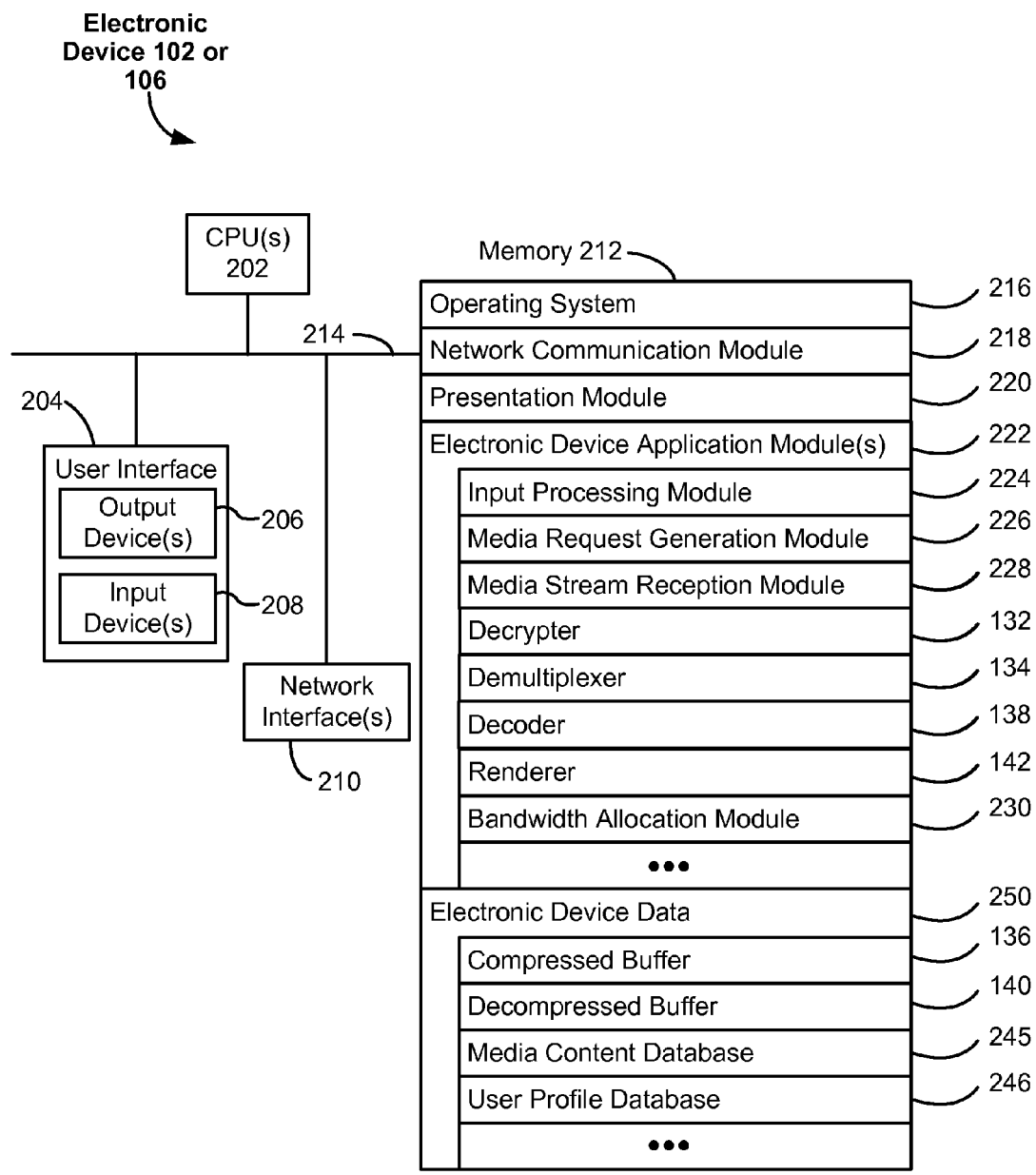
FIG. 2 is a block diagram illustrating an electronic device in accordance with some implementations.

In some implementations, the first electronic device 102-1 includes a media content presentation and control application (presentation module 220 in FIG. 2, sometimes referred to herein as a "media application"). The media application is able to control the presentation of media by the electronic device 102-1. For example, the media application enables a user to navigate media content items, select media content items for playback on the electronic device 102-1, select media streams for presentation, change currently displayed media streams, create and edit playlists, etc. In some implementations, media content is stored by the first electronic device 102-1 itself. In other implementations, the media content is stored by a server system 120, which is, optionally, located remotely from the first electronic device 102-1. The media content is then streamed from the server system 120 to the first electronic device 102-1 over the network 110. As used herein, media content is streamed from a source to a destination by transmitting data corresponding to the media content from the source to the destination over time where a computer at the destination can perform operations on the media content before the media content has been completely received (e.g., a first portion of the media content is received from the source and can be played before a second, later, portion of the media content is received from the source).

In some implementations, the data streamed from the server system 120 is stored/cached by the first electronic device 102-1 in a media content buffer (e.g., compressed buffer 136 in FIG. 1-2 or 408-A or 408-B in FIGS. 4A-4I) in the memory of the first electronic device 102-1. Storing data in a buffer while it is being moved from one place to another (e.g., temporarily storing compressed data received from a content source before it is processed by a codec and/or temporarily storing decompressed data generated by a codec before it is rendered by a renderer) is sometimes referred to as "buffering" data, and data stored in this way is sometimes referred to a "buffered" data. "Buffered" data is typically, but optionally, removed (or marked for deletion) from the buffer in which it was stored after it is transmitted from the buffer to its destination (e.g., a codec or a renderer), rather than being stored for later use. In some implementations, media content stored in the media content buffer is removed after the media content is presented by the first electronic device 102-1, allowing new media content data to be stored in the buffer. In other implementations, at least some of the media content stored in the media content buffer is retained for a predetermined amount of time after the content is presented by the first electronic device 102-1 and/or until other predetermined conditions are satisfied. In some implementations, the media content buffer stores media content from a first media stream. The media content of the first media stream is received from a server system 120-1. In some implementations, the media content buffer stores media content from more than one media content stream.

In some implementations, the media stream data from the server system 120 (or another content source 121 such as a content delivery system or a peer in a peer-to-peer network) is compressed and/or encrypted prior to being transmitted to the first electronic device 102 to reduce the bandwidth needed to transmit the media stream. Once the media stream data has been received by the first electronic device 102-1, the media stream data needs to be decompressed and/or decrypted before it can be presented at a media presentation device. In some implementations, the first electronic device 102-1 includes one or more decrypters 132, one or more demultiplexers 134 (sometimes called demuxers), a compressed data buffer 136, one or more decoders 138, and a decompressed buffer 140. In some implementations, the one or more decrypters 132, the one or more demultiplexers 134, and the one or more decoders 138 are implemented as software modules that are executed on a multi-purpose computer processor. In some implementations, the one or more decrypters 132, the one or more demultiplexers 134, and the one or more decoders 138 are implemented on specialized computer hardware.

In some implementations, the second electronic device 106-1 includes a renderer 142 and an output device 144. In some implementations, some components, such as the one or more decoders 138 and the decompressed buffer 140 can be located in either the first electronic device 102-1 or the second electronic device 106-1. In some implementations, the first electronic device 102-1 transmits the media stream data to the second electronic device 106-1.

In some implementations, the first electronic device 102-1 receives the media stream data from the server system 120-1 (or another content source 121 such as a content delivery system or a peer in a peer-to-peer network) and passes the media stream data to at least one of the one or more decrypters 132. In some implementations, the decrypter 132 receives encrypted data and decrypts it to produce decrypted data. Any appropriate encryption algorithm can be used including, but not limited to, symmetric key encryption algorithms or public-key encryption algorithms. The decrypted data is then passed from the decrypters 132 to one or more demultiplexers 134.

In some implementations, the demultiplexer 134 (also known as a file splitter) separates a media stream that includes interlaced multiple individual component streams into the individual component streams. For example, a media stream includes a video stream, an audio stream, subtitles, and other data that have all been interlaced or interwoven into a single combined media stream. The one or more demultiplexers 134 separates the combined media stream into its constituent parts for separate processing. The one or more demultiplexers 134 output compressed data that is then stored in the compressed data buffer 136.

In some implementations, compressed data stored in the compressed buffer is sent to at least one of the one or more decoders 128. In some implementations, the decoder 138 is the decoding component of a codec (e.g., coder-decoder) that is either implemented by a software module or a specialized piece of computer hardware. In some implementations, a decoder 138 takes encoded information and uses a predefined algorithm to convert the encoded data to decoded, decompressed data. In some implementations, the decoder 138 is any appropriate decoder, including either lossless or lossy decoders. For example, H.264, V9, DivX, Xvid, are all examples of codecs that can be used to encode (e.g., compress) and decode (e.g., decompress) information.

In some implementations, the decrypted, decompressed media stream data is stored in a decompressed buffer 140. In some implementations, the decompressed buffer 140 is fixed in size. In other implementations, the decompressed buffer 140 is dynamically resized to accommodate different amounts of decompressed data (e.g., the decompressed buffer 140 is, optionally, expanded in size as the amount of decompressed data that needs to be stored and is, optionally, reduced in size as the amount of data that needs to be stored decreases). In some implementations, the decompressed data in the decompressed buffer 140 is stored as one or more frames, where each frame includes all the data needed to be displayed on a given display at one time. For example, the decompressed buffer would, in a steady state, store approximately 4 decompressed frames of data (e.g., enough data to display four subsequent frames). In some implementations, when switching between providing a first media stream and a second media stream, the decompressed buffer is increased to store up to 24 frames of decompressed media stream data. In some implementations, the decompressed buffer 140 stores ten to fifteen seconds of video for a first stream while preparing to begin providing a second stream for display.

In some implementations, the renderer 142 prepares the decompressed data stored in the decompressed buffer 140 to be presented on an output device 144. In some implementations, the renderer 142 stores decompressed stream data in a display buffer or frame buffer prior to sending the data to a presentation device. In some implementations, the output device 144 then transfers the rendered data to a device for presenting the media data. In some implementations, the output device 144 itself is a display or audio presentation device and presents the media data directly (e.g., a display or speakers).

For example, the first electronic device 102-1 receives an encrypted/multiplexed/compressed video stream, decrypts the video stream with decrypters 132, demultiplexes the video stream with demultiplexers 134, and stores the decrypted/demultiplexed video stream in compressed buffer 136. The video stream is then decompressed by a decoder 138 at the first electronic device 102-1 or the second electronic device 106-1 and the decrypted/demultiplexed/decompressed video stream is stored in a decompressed buffer 140 at the first electronic device 102-1 or the second electronic device 106-1. The decrypted/demultiplexed/decompressed video stream is provided to a renderer 142 at the second electronic device 106-1 that renders content corresponding to the decrypted/demultiplexed/decompressed video stream, the rendered content is presented to the user using output device 144 (e.g., the video stream is displayed on a display such as a touch screen, computer monitor, or television).

The client-server environment 100 also includes a server system 120. In some implementations, the server system 120 includes a media streaming module 122, a media content database 124, and a context database 126. The media content database 124 stores media content that can be presented by an electronic device. For example, in some implementations, the media content database 124 stores audio (e.g., music, audio books, podcasts, etc.), video (e.g., movies, television shows, etc.), images, or other content that can be streamed to other electronic devices. In some implementations, the media content database includes data stored in different formats and file types to allow a variety of different devices and/or applications to receive streamed content under a variety of different network conditions (e.g., varying available network bandwidth). In some implementations, the data is stored in a single file format and is converted/transcribed/transcoded to the appropriate data type or format before or as it is streamed to a remote device.

In some implementations, the server system 120 includes a media streaming module 122. In some implementations, the media streaming module 122 receives media control requests from electronic devices and streams media content in response. In some implementations, the media streaming module 122 receives media control requests from a first electronic device 102-1. For example, a user sends a media control request to the server using a mobile phone (a first electronic device) requesting that a particular media stream be presented. The server system 120 then sends the requested media stream to the first electronic device 102-1. In some implementations, instead of sending the requested media stream to the first electronic device 102-1, the server system 120 enables the first electronic device 102-1 to obtain the media stream from other content sources 121 (e.g., media servers, content delivery networks or peers in a peer-to-peer network) by sending instructions to the other content sources 121 to deliver the media stream to the first electronic device 102-1 or by sending the first electronic device 102-1 information that enables the first electronic device 102-1 to request the media stream from the other content sources 121 (e.g., identifiers such as IP addresses for other content sources that are available to provide at least a portion of the media stream to the first electronic device 102-1)

In some implementations, the received media control request includes information identifying the stream requested by the first electronic device 102-1 (e.g., information identifying the content requested and/or information identifying the file format processing or other capabilities of the first electronic device 102-1). Accordingly, the media control request will identify that a request is intended for the home stereo, for example, so that the server system 120 can send the requested media and/or the media control request to the home stereo. In some implementations, the electronic device provides the server system with an indication of device capabilities of the device such as screen resolution, processing speed, video buffer size/availability, codec availability and the like, and the server system provides content to the electronic device in accordance with the device capabilities.

In some implementations, the server system 120 includes a context database 126. The context database 126 stores data associated with the presentation of media content by an electronic device. In some implementations, the context database 126 includes, among other things, the current position in a media stream that is being presented by an electronic device, a playlist associated with the media stream, previously played content, skipped pieces of media content, and previously indicated user preferences. For example, the context database, optionally, includes information that a media stream to an electronic device currently is presenting a song, at 1 minute and 23 seconds into the song, as well as all the songs played in the last hour and the next 20 songs in the playlist. In some implementations, the server system 120 transmits the context associated with a media stream to the device that is presenting the media stream so that one or more items of context information can be used by the device, such as for display to the user. In some implementations, when the device to which the media content is being streamed changes, the server system 120 (or another content source 121 such as a content delivery system or a peer in a peer-to-peer network) transmits the context associated with the active media content to the newly active device.

FIG. 2 is a block diagram illustrating an electronic device 102 (or electronic device 106), in accordance with some implementations. The electronic device 102 typically includes one or more processing units (CPUs) 202, one or more network interfaces 210, memory 212, and one or more communication buses 214 for interconnecting these components. The electronic device 102 includes a user interface 204. The user interface 204 includes output device(s) 206, including user interface elements that enable output 206 to be presented to a user, including via speakers or a visual display (sometimes referred to herein as a second electronic device 106). The user interface 204 includes input device(s) 208, including user interface components that facilitate user input such as a keyboard, a mouse, a voice-command input unit, a touch sensitive display, a touch-sensitive input pad, a gesture capturing camera, or other input buttons. In some implementations, the electronic device 102 is a wireless device, such as a mobile phone or a tablet computer. Furthermore, some client systems 101 use a microphone and voice recognition or a camera and gesture recognition to supplement or replace the keyboard. Memory 212 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 212 optionally includes one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the electronic device 102 to other computers via the one or more communication network interfaces 410 (wired or wireless) and one or more communication networks, such as the Internet, other Wide Area Networks, Local Area Networks, Personal Area Networks, metropolitan area networks, VPNs, local peer-to-peer, ad-hoc connections, and so on;
- a presentation module 220 for enabling presentation of media content at the electronic device 102 through the output devices 206 (e.g., screens, speakers, headphones, etc.) associated with the user interface 204 or second electronic device 106-2;
- one or more client system applications module(s) 222 for enabling the electronic device 102 to perform the functions offered by the client system 102, the application module(s) 222 including but not limited to:
  - an input processing module 224 for receiving input from a user through an input device 208 and interpreting the received input;
  - a media request generation module 226 for generating a request for media stream data based on input received from the input processing module 224;
  - a media stream reception module 228 for receiving one or more media streams from a media streaming server, remote from the electronic device 102;
  - a decrypter 132 for using an algorithm to convert encrypted data received from a server system 120 to decrypted data;
  - a demultiplexer 134 for separating a media stream with two or more distinct constituent streams interleaved within it into a plurality of constituent streams;
  - a decoder 138 for decompressing encoded data;
  - a renderer 142 for preparing decrypted, demultiplexed, and decompressed data to be presented on an output device (e.g., output device 206); and
  - a bandwidth allocation module 230 for allocating bandwidth between a first media stream and a second media stream based on predetermined priorities;
- an electronic device data module 250 for storing data, including but not limited to:
  - compressed media data buffer(s) 136 including media stream data received from a content source (e.g., server system 120 or other content source 121 as shown in FIG. 1) for one or more media streams that has been demultiplexed and decrypted and stored in the memory of the electronic device 102;
  - decompressed buffer 140 including media stream data received from a content source (e.g., server system 120 other content source 121, as shown in FIG. 1) that has been decrypted, demultiplexed, and decompressed;
  - media content database 245 for storing, on the local device, media content that is part of the user's personal library of media content; and
  - user profile database 246 for storing account information for a user of the electronic device 102 including user media history, user preferences, determined user interests, and account credentials.

Each of the above identified elements is, optionally, stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules are, optionally, combined or otherwise re-arranged in various implementations. In some implementations, Memory 212 optionally stores a subset of the modules and data structures identified above. Furthermore, Memory 212 optionally stores additional modules and data structures not described above.

Figure 3:
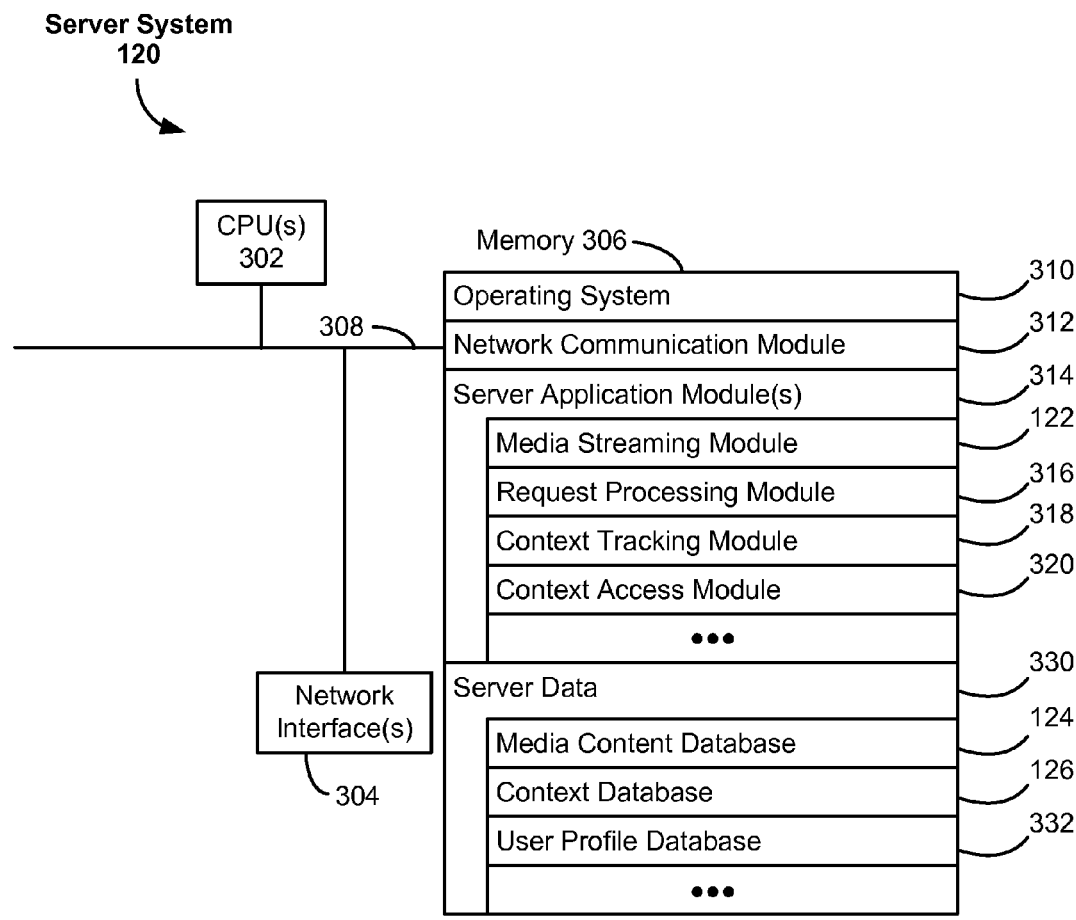
FIG. 3 is a block diagram illustrating a server system in accordance with some implementations.

FIG. 3 is a block diagram illustrating a server system 120, in accordance with some implementations. The server system 120 typically includes one or more processing units (CPUs) 302, one or more network interfaces 304, memory 306, and one or more communication buses 308 for interconnecting these components. Memory 306 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other Wide Area Networks, Local Area Networks, Personal Area Networks, metropolitan area networks, VPNs, and so on;
- one or more server application module(s) 314 for enabling the server system 120 to perform the functions offered by the server system 120, including but not limited to:
  - a streaming module 122 for streaming a media stream to an electronic device (e.g., first and second electronic devices 102-n, 106-n, FIG. 1) remote from the sever system 120;
  - a request processing module 316 for receiving requests from electronic devices (e.g., first and/or second electronic devices 102, 106, FIG. 1), where the requests include requests to stream specific media content to the electronic devices and/or requests to change the destination of the media content stream from one electronic device to another electronic device;
  - a context tracking module 318 for tracking and storing the context of a media stream, optionally including storing, among other data, one or more of the current playback position in a media stream that is currently being presented by an electronic device (e.g., first and/or second electronic devices 102, 106, FIG. 1), the position in a current playlist, the play history of a user, the preferences of a user, previously skipped media content, whether media content items were "liked" or "disliked" (e.g., via "starred," "thumbs-up," and/or "thumbs-down" indications), and the like; and
  - a context access module 320 for allowing electronic devices (e.g., first and/or second electronic devices 102-n, 106-n, FIG. 1) associated with a given user account to access the current context for media streams associated with the given user account; and
- one or more server data module(s) 330 for storing data related to the data server system 120, including but not limited to:
  - media content database 124 including media content and metadata describing the media content and enabling clients to search through the media content to identify media content;
  - a context database 126 including information associated with one or more media streams where context information optionally includes one or more of the current playback position in a media stream, metadata relating to the media, a position in a playlist, play history of a user, user preferences, skipped media, and user settings; and
  - a user profile database 332 including account information for a plurality of users, where the account information for a respective user optionally includes a user media content request/playback history for the respective user, a list of electronic devices associated with the respective user, user preferences of the respective user, and determined user interests of the respective user.

Each of the above identified elements is, optionally, stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules are, optionally, combined or otherwise re-arranged in various implementations. In some implementations, Memory 306 optionally stores a subset of the modules and data structures identified above. Furthermore, Memory 306 optionally stores additional modules and data structures not described above.

Although FIG. 3 shows a "Server System" 120, FIG. 3 is intended more as functional description of the various features that may be present in a set of servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a Server System 120 and how features are allocated among them will vary from one implementation to another, and optionally depends in part on the amount of data traffic that the system must handle during peak usage periods as well as during average usage periods.

Figure 4A:
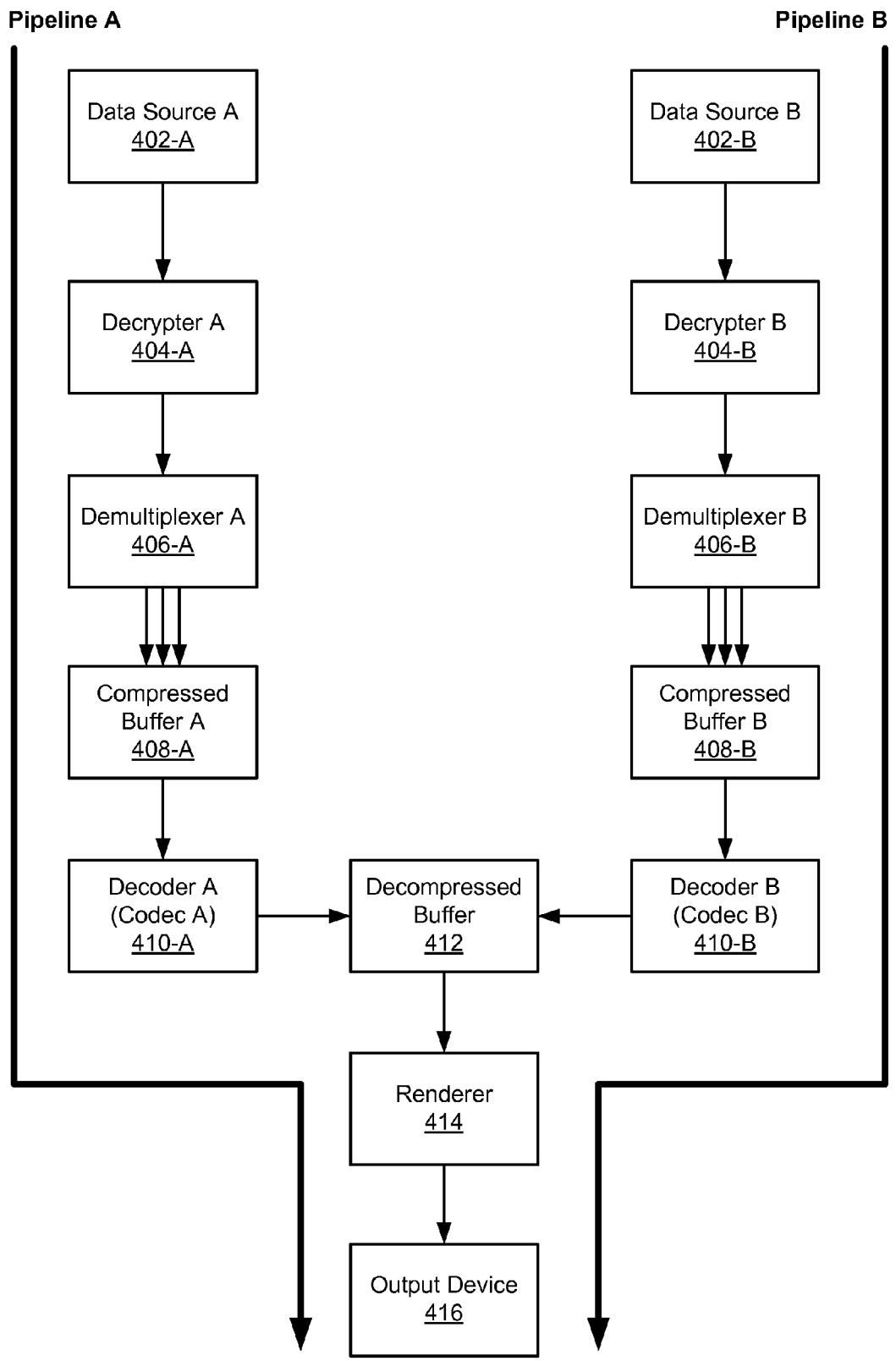

FIG. 4A is a block diagram illustrating the components of two media stream data processing pipelines, in accordance with some implementations that conserve network bandwidth and device processing resources while maintaining a seamless media presentation user experience. In some implementations, an electronic device (e.g., electronic device 102 as shown in FIGS. 1 and 2) includes a first media stream data processing pipeline (pipeline A) and a second media stream data processing pipeline (pipeline B). Each pipeline shown in FIG. 4A, when in operation, decrypts, demultiplexes, and decompresses media stream data received from a data source (e.g., data sources 402 A or 402-B as shown in FIG. 4A) and provides it for presentation at a presentation device (e.g., a video display or an audio presentation device like a stereo or speakers). In some implementations, switching from decompressing a first media stream to decompressing a second media stream when the first media stream is being decompressed with pipeline A includes starting up pipeline B with the second media stream while continuing to decompress the first media stream using pipeline A, as described in greater detail below. Starting up pipeline B while continuing to use pipeline A reduces the amount of time that it takes to switch between media streams and reduces or eliminates the amount of dead time when switching between the first media stream and the second media stream.

In some implementations, the first media stream data processing pipeline (e.g., pipeline A) includes a data source A 402-A (e.g., server system 120 or other content source 121), a decrypter A 404-A (e.g., decrypter 132), a demultiplexer A 406-A (e.g., demultiplexer 134), a compressed data buffer A 408-A (e.g., compressed buffer 136), a decoder A 410-A (e.g., decoder 138), a decompressed buffer 412 (e.g., decompressed buffer 140), a renderer 414 (e.g., renderer 142), and an output device 416 (e.g., output device 144 in FIG. 1 or output device 206 in FIG. 2). The second media stream data processing pipeline (pipeline B) has corresponding sections a data source B 402-B (e.g., server system 120 or other content source 121), a decrypter B 404-B (e.g., decrypter 132), a demultiplexer B 406-B (e.g., demultiplexer 134), a compressed data buffer B 408-B (e.g., compressed buffer 136), a decoder B 410-B (e.g., decoder 138), a decompressed buffer 412 (e.g., decompressed buffer 140), a renderer 414 (e.g., renderer 142), and an output device 416 (e.g., output device 144 in FIG. 1 or output device 206 in FIG. 2). In some implementations, any component in pipeline B is the same as the corresponding component in pipeline A. For example, if the two media streams both use the same codec for encoding or decoding, then both pipeline A and pipeline B have the option to use the same instance of decoder 410 to decompress the media stream. While compressed buffer A 408-A and compressed buffer B 408-B are shown as separate components in FIG. 4A, in some implementations, content from compressed buffer A 408-A and compressed buffer B 408-B are stored in a same physical storage device (e.g., a HDD, solid state storage device or other memory device) but are logically separated so that decoder A 410-A is enabled to access the content in compressed buffer A 408-A and decoder B 410-B is enabled to access the content in compressed buffer B 408-B.

In some implementations, the data source 402 streams media data to an electronic device (e.g. device 102 as shown in FIGS. 1 and 2) for presentation. In some implementations, the media data received from the data source 402 has been encrypted and the decrypter 404 decrypts the encrypted data. In some implementations, the media data is also multiplexed. Multiplexed media streams have several distinct media streams interleaved into a single media stream. In some implementations, the demultiplexer 406 separates the distinct media streams into individual component streams for easier processing. For example, a multiplexed media stream could include an audio stream, a video stream, a text or subtitle stream, a control command stream, and an interactive metadata stream. Each individual media stream is separated out and processed individually.

In some implementations, once the data has been decrypted and demultiplexed, the compressed data is stored in a compressed data buffer 408. In some implementations, the decrypter 404, the demultiplexer 406, and the compressed data buffer are all implemented in software. In some implementations, the compressed data stored in the compressed data buffer 408 is decompressed by the decoder 410.

In some implementations, decompressing includes decompressing the data to return the data to its original decompressed size. This decompressed data is then stored in the decompressed buffer 412. In some implementations, the decoder 410 and/or the decompressed buffer 412 are implemented as software modules and databases (e.g., a software decoder uses resources from a CPU or GPU to decode the compressed media stream). In other implementations, the decoder 410 and/or the decompressed buffer 412 are implemented in hardware. For example, a graphics processing unit (GPU) optionally contains hardware dedicated to decompressing media streams quickly and efficiently.

In some implementations, the decompressed data is delivered to the renderer 414 (e.g., image/video rendering circuitry in a GPU and/or digital or analog audio output circuitry). The renderer 414 maps the decompressed data to the presentation device, such that the data will be presented properly. For example, the renderer 414 fills a frame buffer with values for each pixel on a display for each frame to be displayed. In some implementations, the output device then sends the data to a presentation device. In some implementations, the output device 416 is a presentation device such as a display or a stereo or other audio presentation device. In situations where the media stream includes visual and audio data, the visual data is routed to a display device and the audio data is routed to an audio device.

In some implementations, when a second media stream is selected, the electronic device (e.g. device 102 as shown in FIGS. 1 and 2) initiates the transition from providing the first media stream for presentation to providing the second media stream for presentation by creating second instantiations for each component of the media stream processing pipeline with the exception of the decompressed buffer 412, the renderer 414, and the output device 416. In other implementations, the electronic device (e.g. device 102 as shown in FIGS. 1 and 2) uses the already created instantiations of the components of the media stream processing pipeline if possible.

Attention is now directed towards FIGS. 4B-4I, which illustrate the process of transitioning between providing a first media stream for presentation to providing a second media stream for presentation by an electronic device (e.g., device 102 in FIGS. 1 and 2). FIGS. 4B-4I illustrate eight stages during the process of transitioning between providing a first media stream for presentation to providing a second media stream for presentation. The stages described below are examples of stages in the transition between pipeline A (for decrypting, demultiplexing, and decompressing media stream A) and pipeline B (for decrypting, demultiplexing, and decompressing media stream B), however the stages described below are not necessarily an exclusive list of stages and additional stages are, optionally, added, or some stages are, optionally, removed. The flow diagrams in these figures are used to illustrate the processes described below, including the processes in FIGS. 5A-5I and 6. In FIGS. 4B-4I when a particular block is active, it will be represented with bolder (e.g., noticeably darker) lines. A block that is not bolded is either inactive or currently non-existent (e.g., a second instantiation of a decoder is not active until it is needed).

FIG. 4B illustrates stage 1 of the transition between a first media stream and a second media stream (e.g., the first media stream is provided for display and no indication has been received to begin receiving a different media stream). In some implementations, in response to receiving a request to begin providing a second media stream for presentation instead of the first media stream (e.g., stream A), the electronic device increases the rate at which data is decompressed by the decoder 410-A such that the level of data stored in the decompressed buffer 412 increases. In some implementations, the electronic device receives a first media stream from a first data source 402-A. The media stream data is decrypted and demultiplexed by the decrypter 404-A and the demultiplexer 406-A respectively. The decrypted and demultiplexed media stream data is stored in the compressed data buffer A. In some implementations, while the electronic device is receiving the first stream data and providing it for presentation, the compressed data buffer 408-A is full of data. In some implementations, the decoder 410-A decompresses data from the compressed data buffer 408-A and stores the decompressed stream A data in the decompressed buffer 412. While providing the first media stream for presentation, the decompressed buffer 412 stores a relatively small amount of decompressed stream A data (e.g., only stores data as needed to provide for presentation, so as to free up memory resources at the electronic device for other purposes). In some implementations, approximately 2-10 frames of media data (e.g., 4 video frames) are stored during stage 1. Data from the decompressed buffer 412 is rendered by the renderer 414 and transmitted to the output device 416 for presentation.

FIG. 4C illustrates stage 2 of the transition between a first media stream and a second media stream. In some implementations, in response to receiving a request to begin providing a second media stream for presentation, the electronic device increases the rate at which data is decompressed by the decoder 410-A such that the amount of decompressed stream A data stored in the decompressed buffer 412 is increased, as shown by the increasing amount of decompressed A data shown in decompressed buffer 412 in FIG. 4C. In some implementations, the size of the decompressed buffer 412 is increased to hold approximately 15-50 frames of media data (e.g., 24 video frames) during stage 2.

FIG. 4D illustrates stage 3 of the transition between providing a first media stream for presentation and providing a second media stream for presentation. In some implementations, during stage 3 (e.g., after decompressed buffer 412 is full of decompressed A data), the amount of data stored in the decompressed buffer 412 and or compressed buffer 408-A is sufficient to provide first media stream data for presentation continuously until the second media stream data is ready for presentation. After the electronic device has sufficient data (e.g., ten seconds of video data) to provide the first media stream for presentation continuously until the second media stream is ready for presentation, the electronic device ceases to receive the first media stream from the first data source 402-A. As the electronic device ceases to receive new data from the first data source 402-A, the electronic device no longer needs to decrypt or demultiplex data from the first data source 402-A. As such, the decrypter 404-A and the demultiplexer 405-A cease operations. In some implementations, the decoder 410-A continues to decompress compressed data stored in the compressed data buffer 408-A. The amount of data stored in the compressed data buffer 408-A decreases as the remaining stored data is decompressed (e.g., because the first media stream has ceased to be received from the first data source 402-A). In some implementations, while the electronic device ceases to receive the first media stream from the first data source 402-A, the electronic device requests a second media stream from the second data source 402-B. The electronic device begins receiving the second media stream from the second data source 402-B. The electronic device then begins to decrypt the second media stream with the decrypter 404-B and demultiplex the second media stream with the demultiplexer 404-B while continuing to decompress the first media stream from compressed data buffer 408-A with codec 410-A and continuing to provide media stream A from decompressed buffer 412 to output device 416.

Figure 4G:
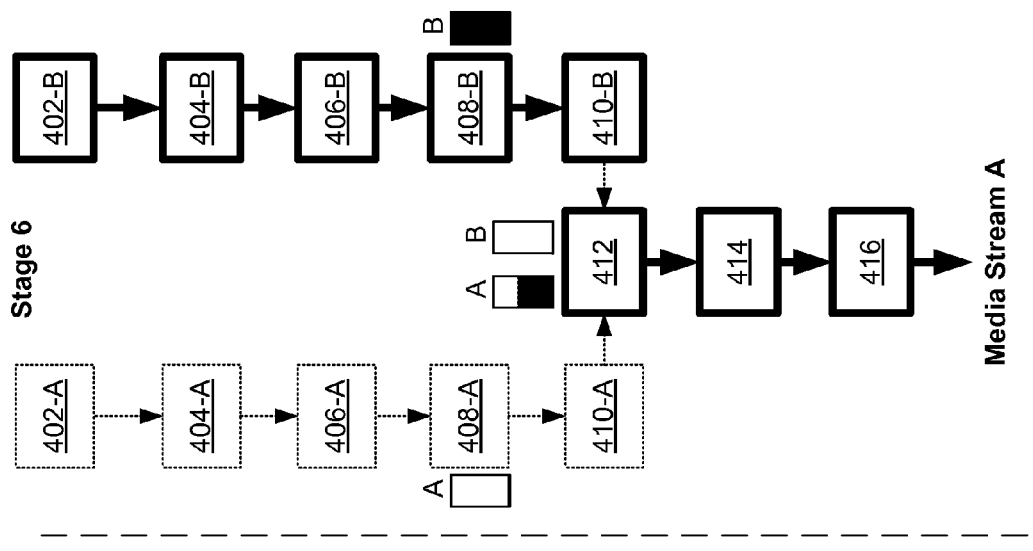
Figure 4F:
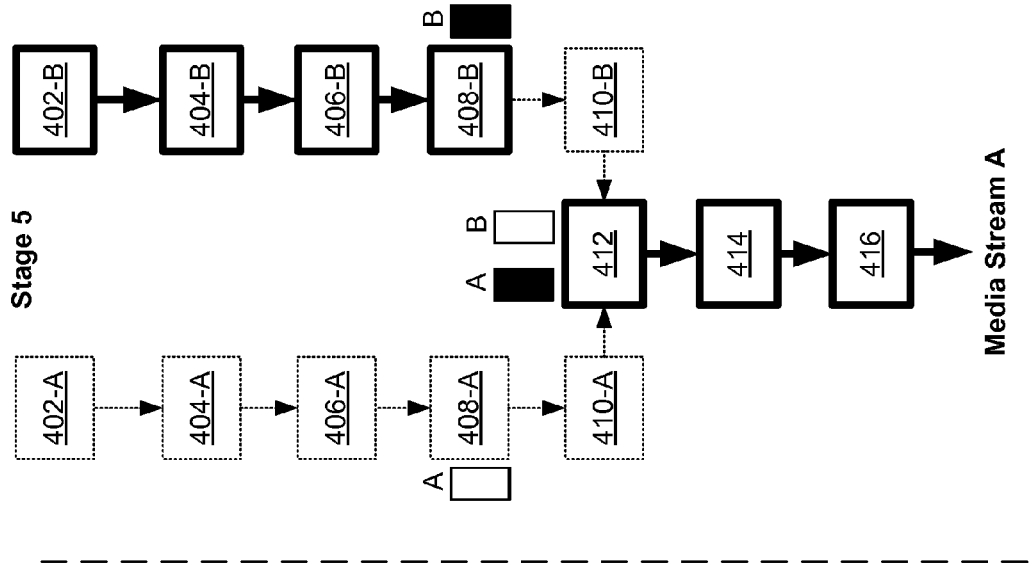
Figure 4E:
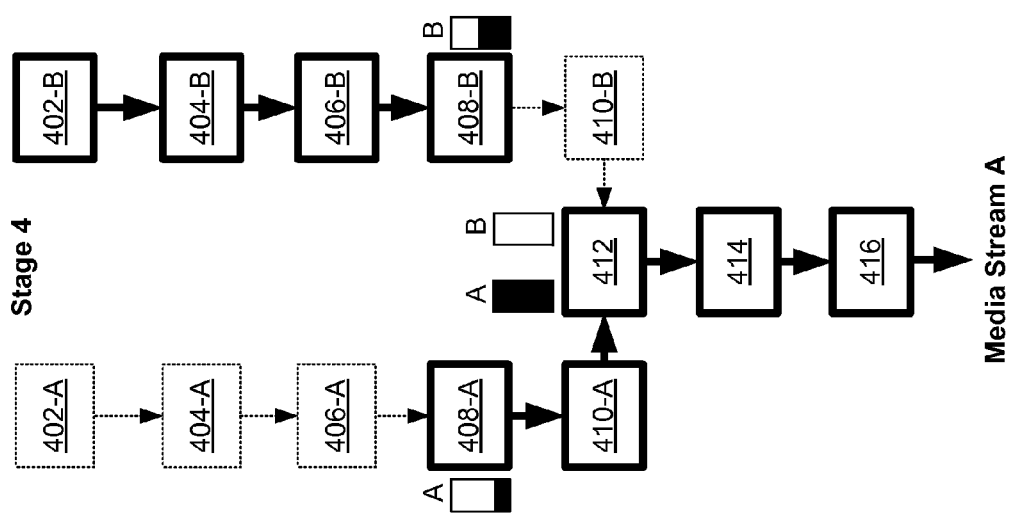
Figure 5A:
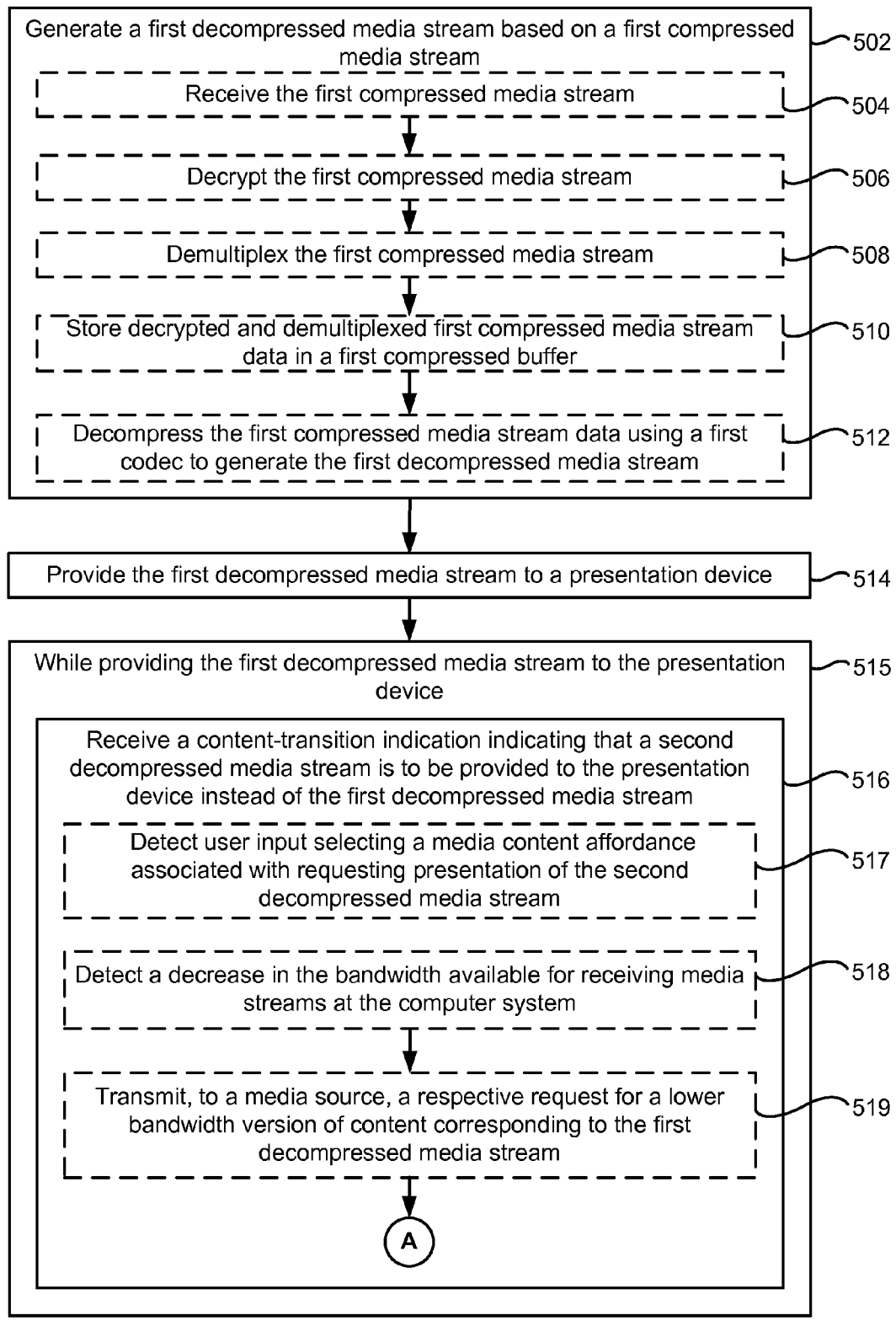
FIGS. 5A-5I are flow diagrams illustrating a method of switching from a first video stream to a second video stream, in accordance with some implementations.
Figure 5B:
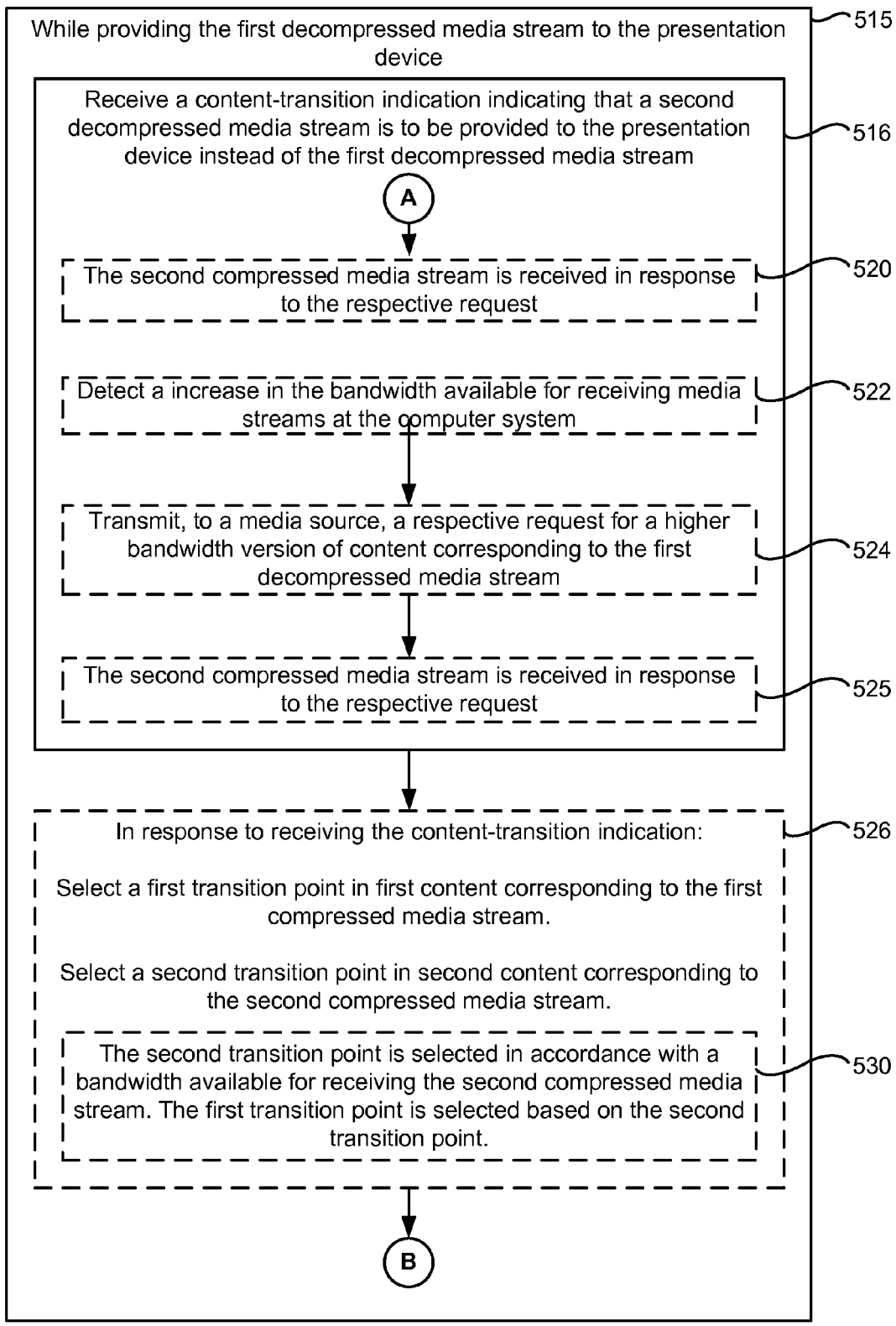
Figure 5C:
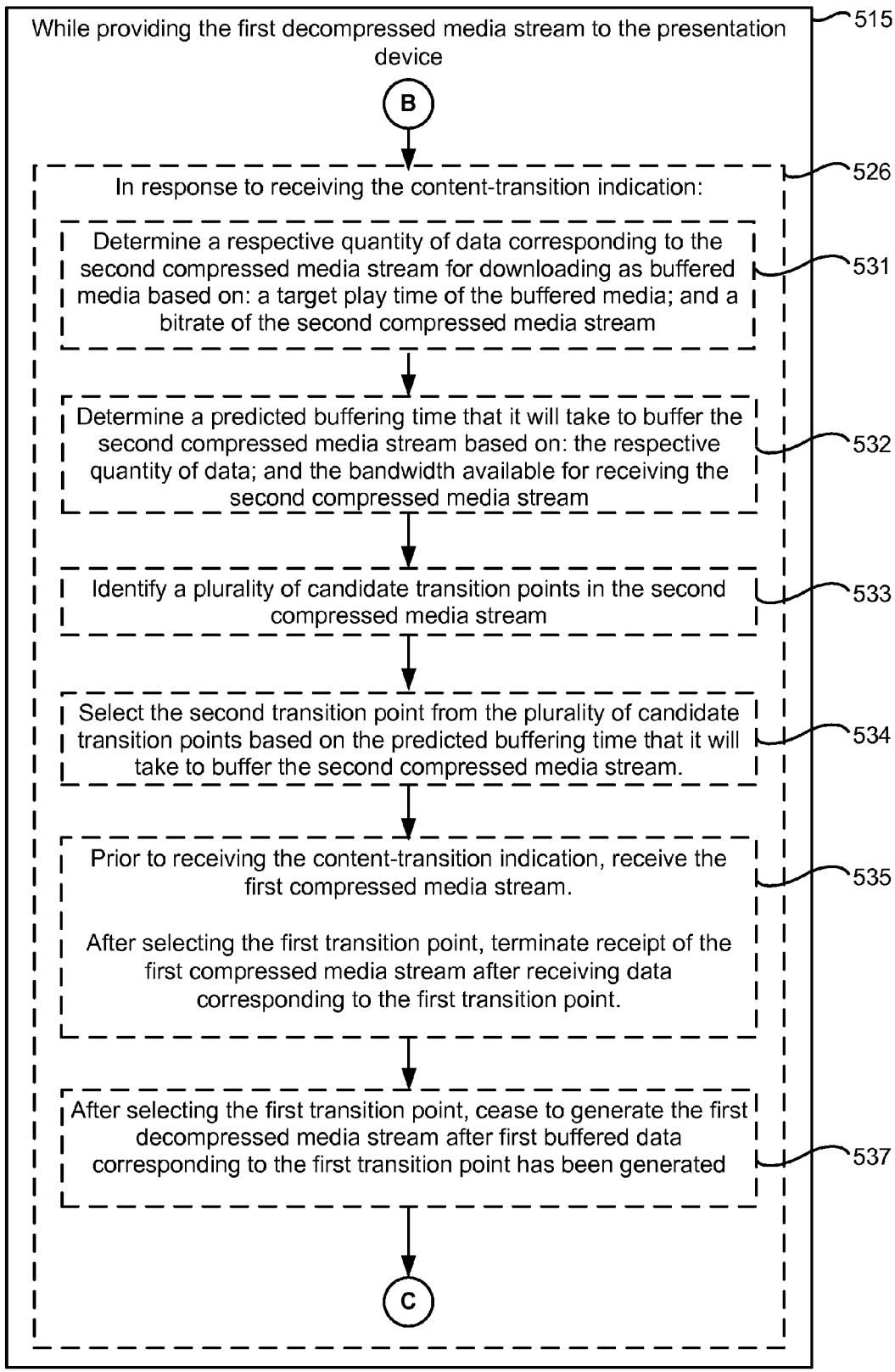
Figure 5D:
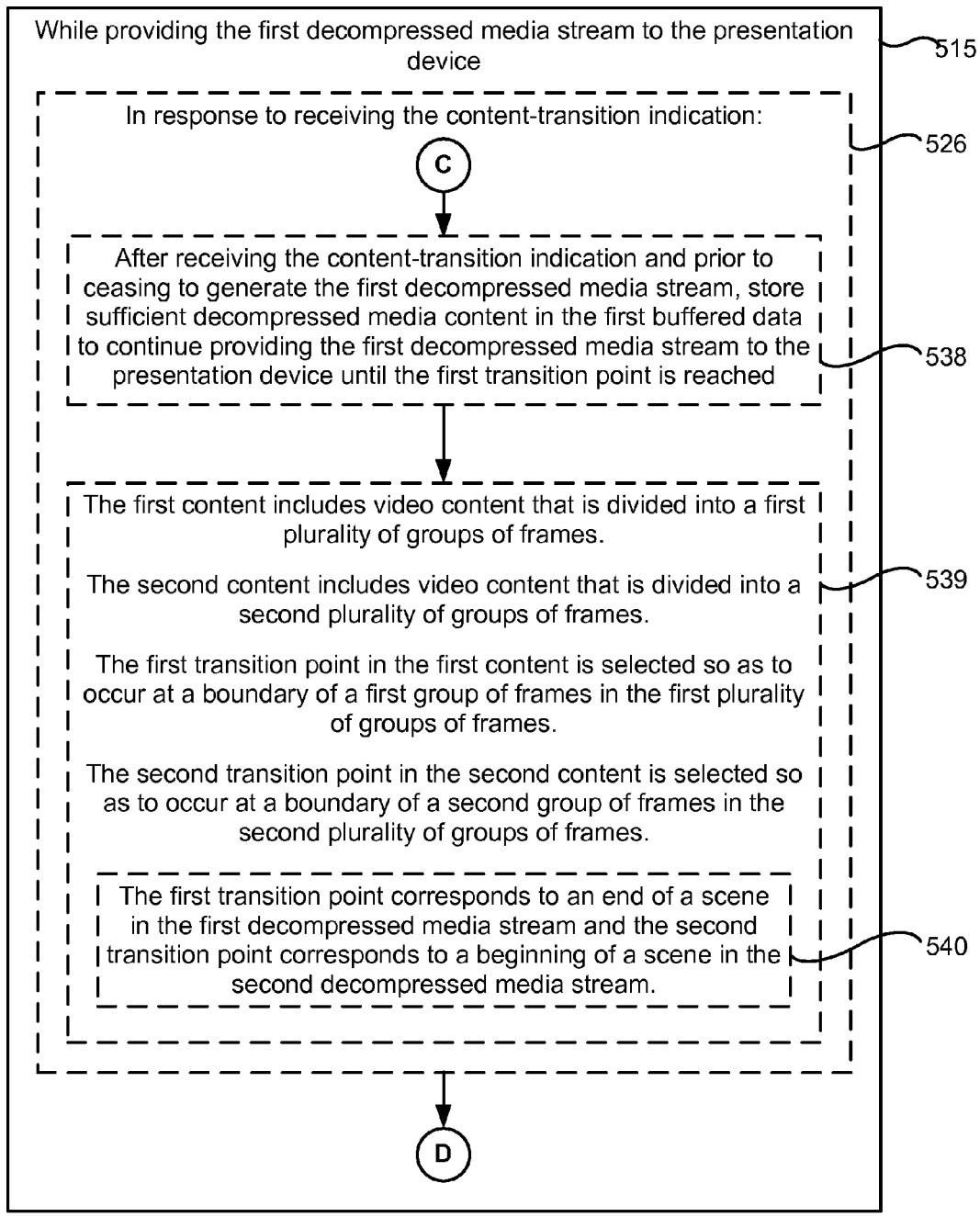
Figure 5E:
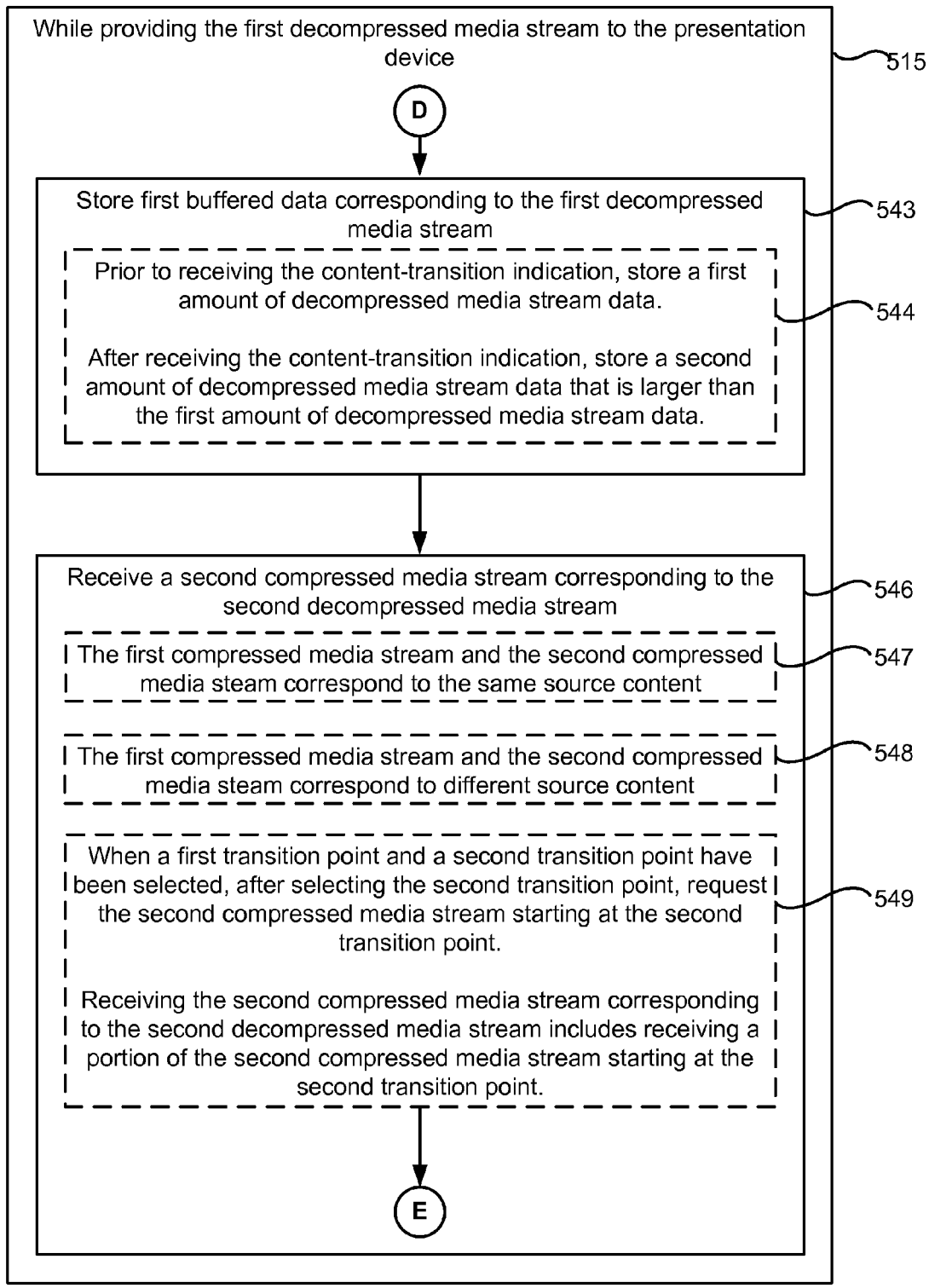
Figure 5F:
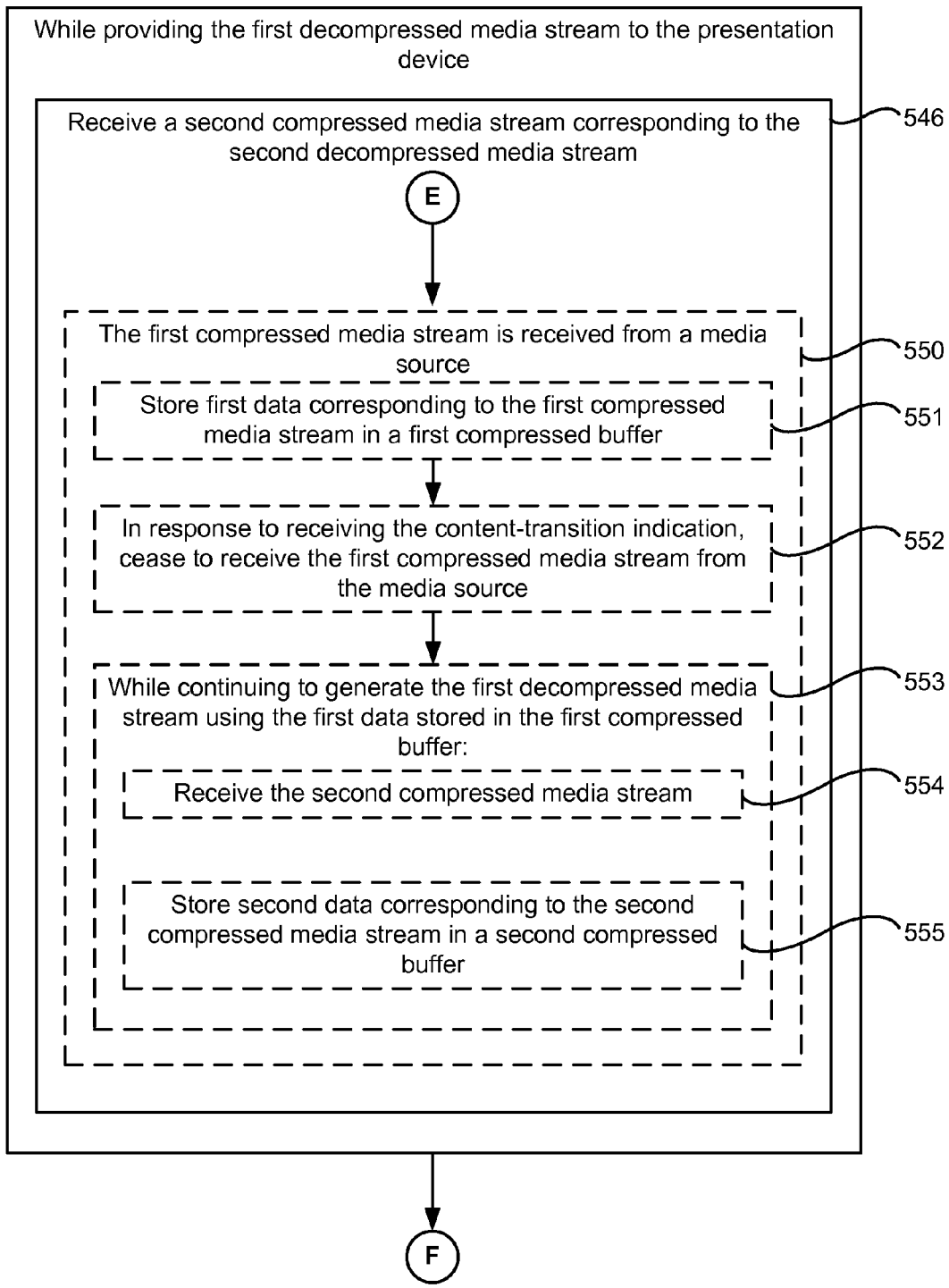
Figure 5G:
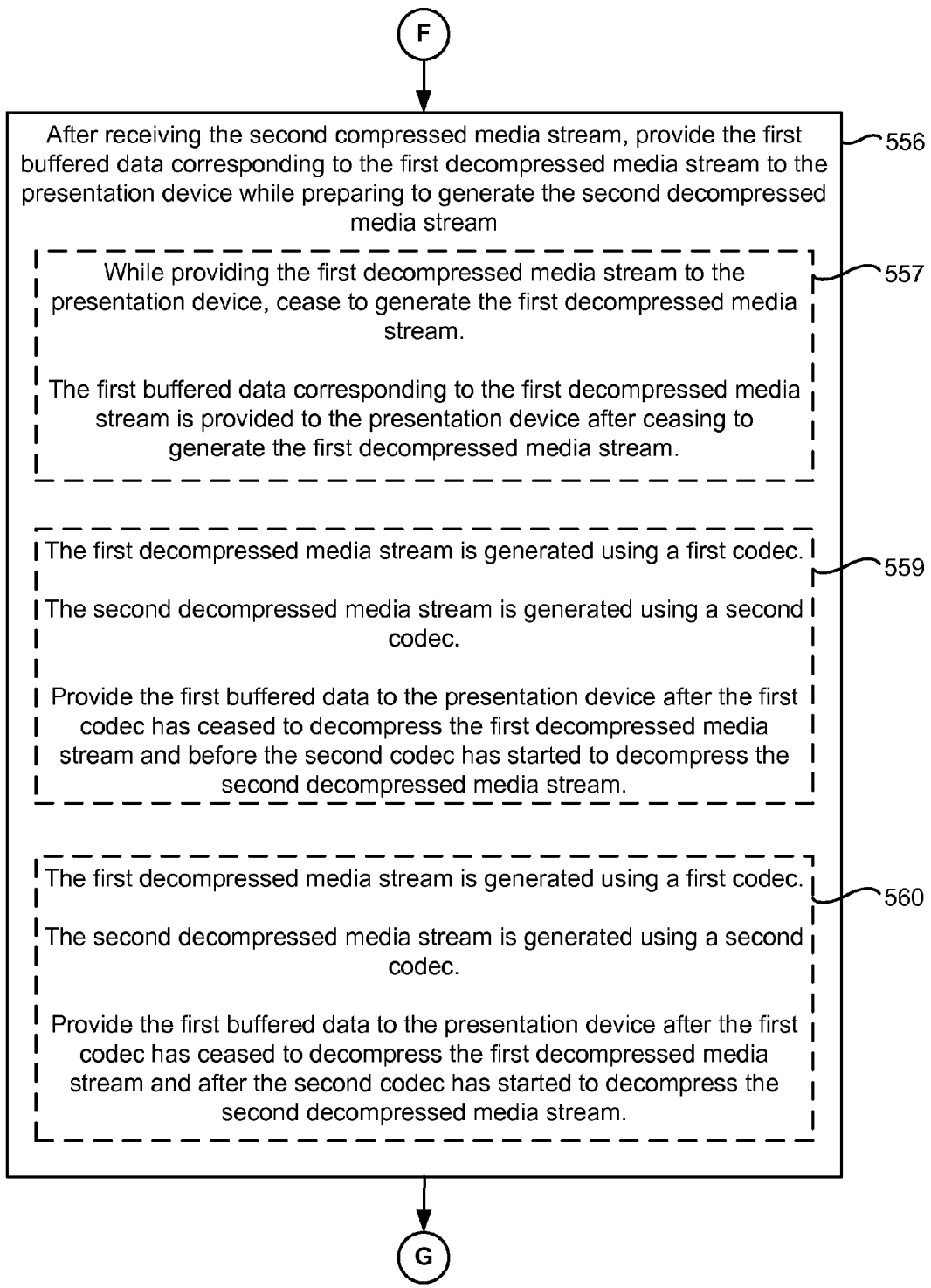
Figure 5H:
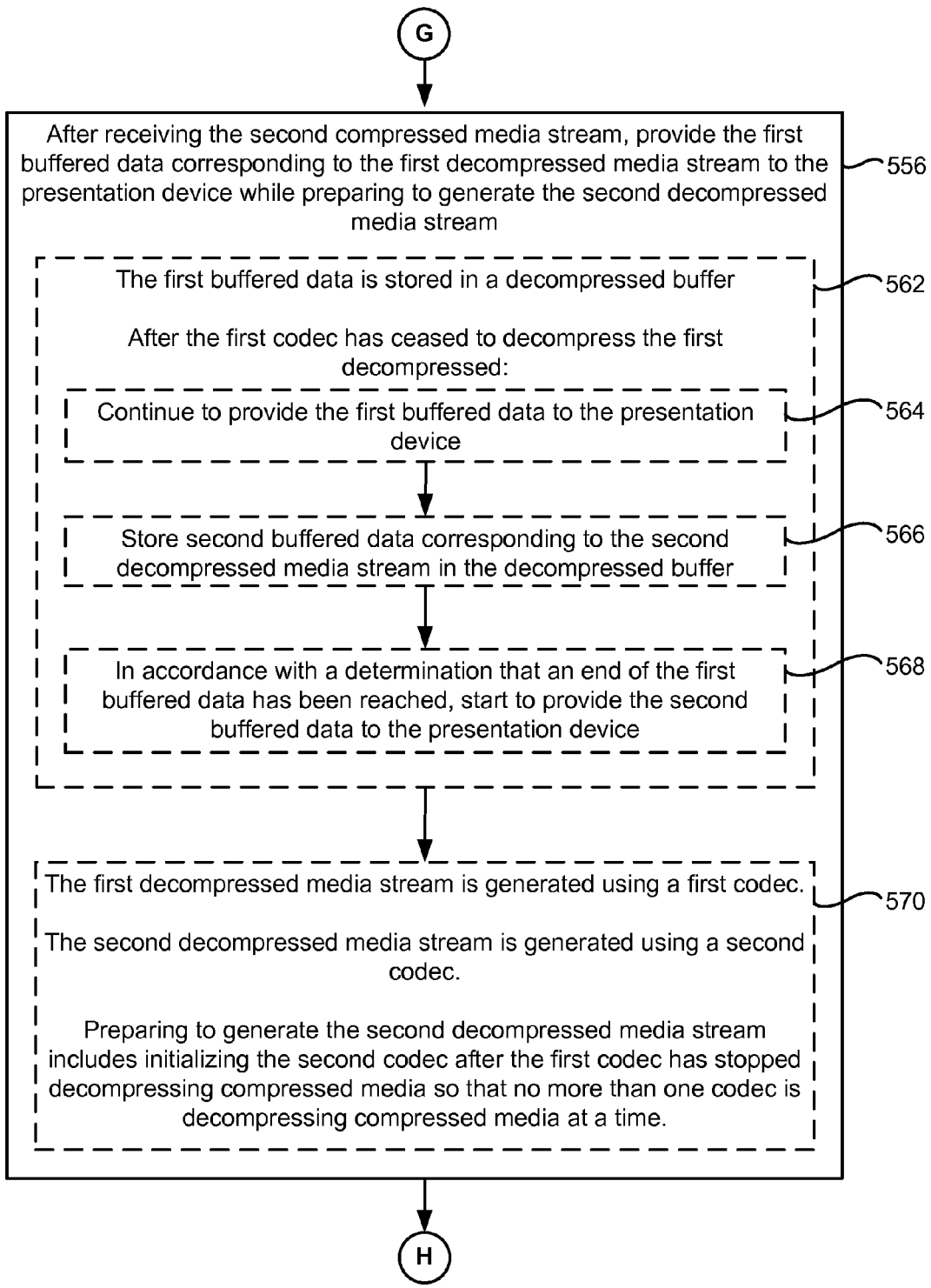
Figure 5I:
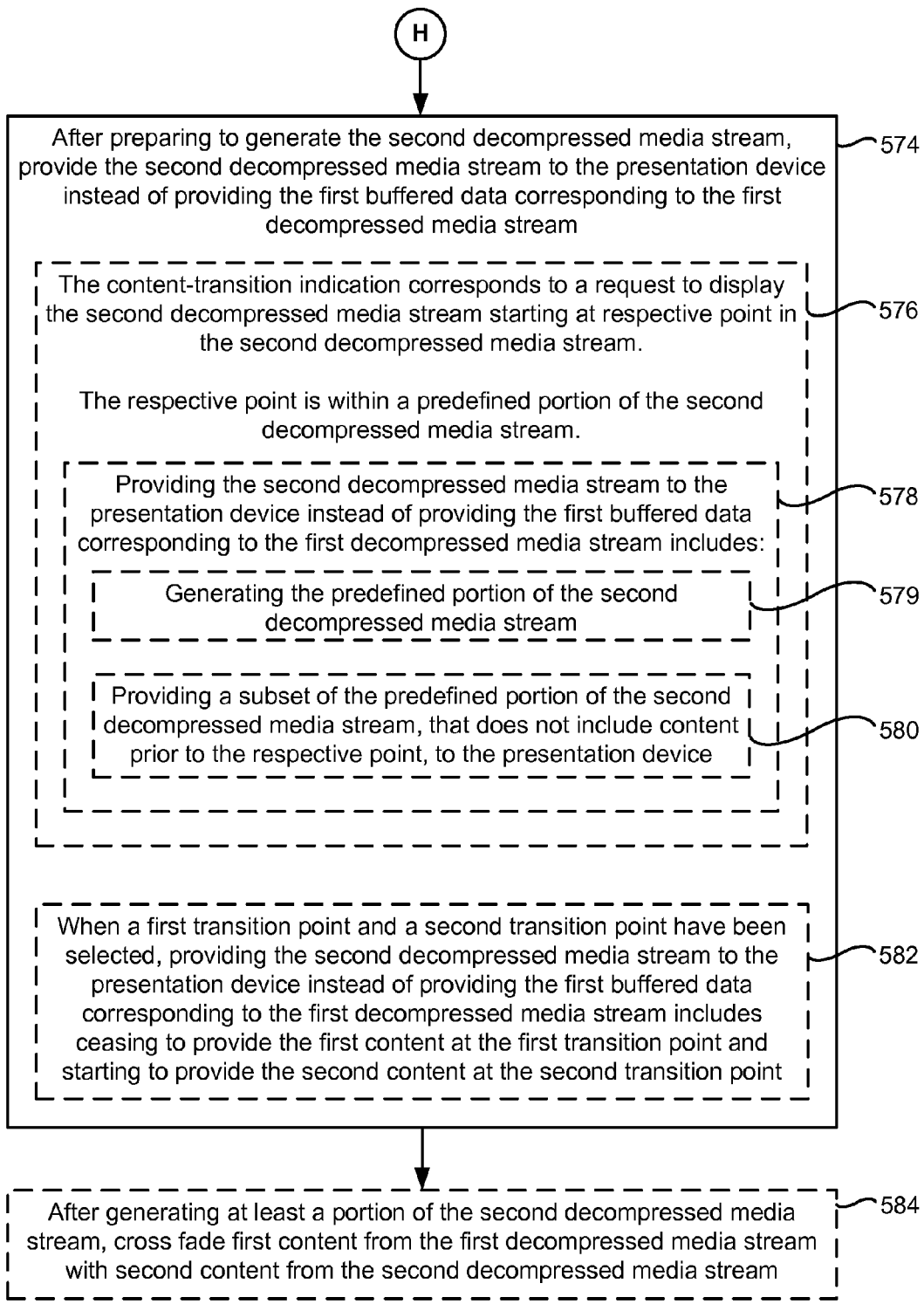

FIG. 4E illustrates stage 4 of the transition between providing a first media stream for presentation and providing a second media stream for presentation. In some implementations, during stage 4, the electronic device continues to decompress the remaining compressed data stored in the first compressed data buffer 408-A and, as a consequence, the amount of data stored in the first compressed data buffer 408-A decreases. In some implementations, the electronic device also begins to store decrypted and demultiplexed data from the second media stream in the second compressed data buffer 408-B. While storing the decrypted and demultiplexed data from the second media stream in the second compressed data buffer 408-B, the electronic device continues to provide media stream A from decompressed buffer 412 to output device 416.

FIG. 4F illustrates stage 5 of the transition between providing a first media stream for presentation and providing a second media stream for presentation. In some implementations, during stage 5, the electronic device finishes decompressing all of the remaining compressed data stored in the first compressed data buffer 408-A and then ceases to operate the decoder 410-A. The electronic device provide media stream A from decompressed buffer 412 to output device 416 based on the decompressed stream A data stored in the decompressed buffer 412. The electronic device fills the compressed data buffer 408-B with second media stream data and begins to start up the second decoder 410-B.

FIG. 4G illustrates stage 6 of the transition between providing a first media stream for presentation and providing a second media stream for presentation. In some implementations, during stage 6, the electronic device continues to provide decompressed media data from the first media stream from the decompressed buffer 412 to the renderer 414 and then to the output device 416. As decompressed media data from first media stream is provided from the decompressed buffer 412, the amount of media data from the first media stream stored in the decompressed buffer decreases. Concurrently with providing the first media stream to the output device, the second renderer 410-B begins to decompress second media stream data from the second compressed data buffer 408-B.

FIG. 4H illustrates stage 7 of the transition between providing a first media stream for presentation and providing a second media stream for presentation. In some implementations, during stage 7, the electronic device decompresses compressed second media stream data with the second decoder 410 and stores the decompressed stream B data in the decompressed buffer 412. In some implementations, the electronic device continues to provide decompressed stream A data from the first media stream for presentation until all the decompressed stream A data from the first media stream has been presented by output device 416. In some implementations, once decompressed stream B data from the second media stream is available, the electronic device immediately ceases providing stream A data from the first media stream and begins providing stream B data from the second media stream for presentation by output device 416. In this case, the extra decompressed stream A data from the first media stream that is not provided for presentation is removed (e.g., discarded or overwritten) from the decompressed buffer 412 (e.g., stream A data is flagged in the buffer and is marked for deletion when it is no longer needed).

FIG. 4I illustrates stage 8 of the transition between providing a first media stream for presentation and providing a second media stream for presentation. In some implementations, during stage 8, the electronic device has transitioned from pipeline A to pipeline B and now provides decompressed stream B data to output device 416 while concurrently receiving decrypting, demultiplexing, and decompressing stream B data. The steps described above enable the electronic device to transition from decompressing one compressed media stream to decompressing another media stream that avoids generating a human perceptible gap between the decompressed media streams, and without forcing the electronic device to run two codecs concurrently, thereby providing an improved user experience while improving device performance. In some implementations, running two decoders at the same time is not possible (e.g., the electronic device does not have two hardware decoders or does not have the computing resources to run two software decoders concurrently), or running two decoders concurrently produces unacceptable system resource usage (e.g., excessive battery drain, excessive heat production, a reduction in user interface responsiveness, or the like) and thus the device shuts down the first decoder 410-A before starting up the second decoder 410-B so that the first decoder and the second decoder are not running concurrently. Additionally, it is cheaper to manufacture devices that have only one hardware decoder, and thus by improving the performance of a device with one hardware decoder so that it close to or the same as the performance of a device with two hardware decoders, using the methods described in FIGS. 4B-4I, then the price of the electronic device can be reduced.

FIGS. 5A-5I are flow diagrams illustrating a method 500 of transitioning from decompressing one compressed media stream to decompressing another compressed media stream in accordance with some implementations. The method 500 is performed at a computer system (e.g., device 102 as shown in FIGS. 1 and 2). Some operations in method 500 are, optionally, combined and/or the order of some operations is, optionally, changed.

As described below, the method 500 provides a fast and efficient way to seamlessly transition between media streams. The method reduces the likelihood of interruption or unnecessary delay of the viewing experience when transitioning from a first media stream to a second media stream, thereby creating a better user experience. Furthermore, the method ensures that the transition occurs efficiently, minimizing the power needed and the strain placed on the computing resources of the computer system (e.g. device 102 as shown in FIGS. 1 and 2). For battery-operated electronic devices, enabling efficient and seamless transitions between media streams conserves power and increases the time between battery charges.

In some implementations, the computer system (e.g. device 102 as shown in FIGS. 1 and 2) generates (502) a first decompressed media stream based on a first compressed media stream (e.g., as shown in FIG. 4B, as stage 1). In some implementations, prior to generating the first decompressed media stream, the computer system stores a first compressed media stream in a first compressed buffer (e.g., the first compressed buffer 410-A as shown in FIGS. 4A-4I). In some implementations, decompressed media is generated by decompressing compressed media to generate data corresponding to audio and/or visual content that is ready for presentation to an end user, such as video or audio content presented on a display or via speakers. In some implementations, the decompressed media is uncompressed media.

In some implementations, while generating the first decompressed media stream based on the first compressed media stream, the computer system receives (504) the first compressed media stream (e.g., data moving from the first data source 402-A to the decrypter 404-A as shown in FIG. 4B). The computer system also decrypts (506) the first compressed media stream (e.g., the decrypter 404-A as shown in FIGS. 4A-4I, decrypts data from the first data source 402-A). In some implementations, the computer system further demultiplexes (508) the first compressed media stream (e.g., the first demultiplexer 406-A as shown in FIGS. 4A-4I, demultiplexes data from the first data source 402-A). The computer system then stores (510) the decrypted and demultiplexed first compressed media stream data in a first compressed buffer (e.g., 410-A in FIGS. 4A-4I). In some implementations, the computer system decompresses (512) the first compressed media stream data using a first codec to generate the first decompressed media stream (e.g., the decoder 410-A as shown in FIGS. 4A-4I decompresses the compressed data).

In some implementations, the computer system provides (514) the first decompressed media stream to a presentation device (e.g., a device with a display and/or speakers, such as a stand-alone display and/or speaker system such as output device 144 in FIG. 1, output device 206 in FIG. 2, or output device 416 in FIGS. 4A-4H). In some implementations, while providing (515) the first decompressed media stream to the presentation device the computer system receives (516) a content-transition indication indicating that a second decompressed media stream is to be provided to the presentation device instead of the first decompressed media stream. In some implementations, receipt of the content transition indication triggers the transition from stage 1 shown in FIG. 4B to stage 2 shown in FIG. 4C. In some implementations, receiving the content-transition indication includes detecting (517) user input selecting a media content affordance associated with requesting presentation of the second decompressed media stream.

In some implementations, receiving the content-transition indication includes detecting (518) a decrease in the bandwidth available for receiving media streams at the computer system (e.g., the computer system monitors the bandwidth currently available and if the bandwidth available for receiving media streams drops below a predetermined level or if the bandwidth drops by a predetermined amount, a content-transition indication is received), and the computer system transmits (519), to a media source, a respective request for a lower bandwidth version of content corresponding to the first decompressed media stream (e.g., the same source content but with a lower bit rate). In some implementations, the second compressed media stream is received (520) in response to the respective request. In some implementations, the computer system ceases to receive the first compressed media stream when the computer system begins receiving data from the compressed second media stream.

In some implementations, receiving the content-transition indication includes detecting (522) an increase in the bandwidth available for receiving media streams at the computer system, and the computer system transmits (524), to a media source, a respective request for a higher bandwidth version of content corresponding to the first decompressed media stream (e.g., the same source content but with a higher bit rate). In some implementations, the second compressed media stream is received (525) in response to the respective request.

In some implementations, in response (526) to receiving the content-transition indication, the computer system selects a first transition point in first content corresponding to the first compressed media stream and selects a second transition point in second content corresponding to the second compressed media stream. In some implementations, the second transition point is selected (530) in accordance with the bandwidth available for receiving the second compressed media stream; and the first transition point is selected based on the second transition point. In some implementations, the second transition is also selected in accordance with one or more of: a target amount of buffered compressed media, transmission latency, content bit rate, and/or key frame location.

In some implementations, the second transition point is selected so as to ensure that enough of the second media stream has been buffered to ensure smooth streaming of the second media stream. In some implementations, the computer system determines (531) a respective quantity of data corresponding to the second compressed media stream for downloading as buffered media (e.g., prior to starting to provide the second decompressed media stream to the presentation device) based on: a target play time of the buffered media and a bit rate of the second compressed media stream. After the respective quantity of data has been determined, the computer system determines (532) a predicted buffering time that it will take to buffer the second compressed media stream based on: the respective quantity of data and the bandwidth available for receiving the second compressed media stream. The computer system also identifies (533) a plurality of candidate transition points in the second compressed media stream. After determining the predicted buffering time and identifying the candidate transition points, the computer system selects (534) the second transition point from the plurality of candidate transition points based on the predicted buffering time that it will take to buffer the second compressed media stream. In some implementations, the second transition point is a first key frame in the content corresponding to the second compressed media stream that corresponds to a timestamp that is greater than or equal to a current time plus the predicted buffering time.

An example of logic for selecting the second transition point includes: for a target play time of buffered media (e.g., four seconds of media) and a bit rate of the second compressed media stream (e.g., 2 MB/s), the computer system determines a respective quantity of data to be downloaded for the second stream of media E (enough) (e.g., if the bit rate is 2 MB/s and the target play time of buffered compressed media is four seconds then the respective quantity of data to be downloaded is 8 MB). Continuing with this example, after determining the respective quantity of data to be downloaded, the device determines a predicted time to download the respective quantity of data based on the respective quantity and the bandwidth available for receiving the second media stream plus a safety margin (e.g., if the respective quantity is 8 MB, the bit rate is 8 MB/s and the safety margin is 1 second, then the predicted time is 2 seconds=(8 MB/8 MB/s)+1 second; similarly, if the respective quantity is 8 MB, the bit rate is 0.5 MB/s and the safety margin is 1 second, then the predicted time is 17 seconds=(8 MB/0.5 MB/s)+1 second).

In some implementations, the safety margin is a multiple of the latency of communications between the device and the source of the second compressed media stream (e.g., two times the latency, where a common latency is a time between 100 to 900 milliseconds). In some implementations, the predicted time has a minimum value of two seconds (e.g., the second transition point is selected as a transition point that is at least two seconds in the future). In some implementations, the predicted time has a maximum value of twenty seconds (e.g., if the device is on a very slow connection that cannot download the respective quantity of the second media stream within 20 seconds, then the device still selects a transition point within twenty seconds and accepts the possibility that the target play time of buffered media for the second compressed media stream will not be stored before starting to provide content corresponding to the second compressed media stream to the user.

In some implementations, the computer system selects a key frame as the transition point. A key frame (also known as an Intra Frame) in at least some video compression formats S is a frame that contains complete image data in the stream. In order to reduce the amount of data that must be transferred, only changes that occur from one frame to the next are transmitted between key frames. For example, the computer system receives a key frame, and then only receives data change information for a plurality for subsequent frames. After a plurality of subsequent frames the computer system then receives a subsequent key frame. In some implementations, data in media data streams are grouped into clusters by key frames. In some implementations, clusters are then grouped into segments that include about 10 MB of data.

In some implementations, while performing on-demand encoding, the key frames are found first in the primary stream. Then corresponding key frames are inserted into all of the supporting bit rates at the same time code, which requires some additional processing time especially as N grows large for N bit rates. In some implementations, each stream includes a video header such as an HTTP Live Streaming (HLS) header that lists all the HLS segments in the media data stream. In some implementations, HLS segments are based on time. In other implementations, the HLS segments are based on size. In some implementations, a segment header lists out all segments, SHA-1 hashes, and file sizes. In some implementations, the first segment includes a segment header in addition to the normal 10 MB of data and thus is over 10 MB in total and the last segment is smaller than 10 MB. In some implementations, segments are designed to be variable in size based on cluster boundaries. In some implementations, the computer system requests a live stream by accessing the same URL every few seconds and retrieves new HLS segments via playlists. In some implementations, the server system (e.g., server 120 in FIGS. 1 and 3 or another content source 121 in FIG. 1) pushes the segments to the computer system to ensure the computer system does not have to contact the server repeatedly.

In some implementations, key frames occur at fixed intervals within a stream (e.g., every three seconds). In other implementations, key frames are dynamically chosen based on stream content (e.g., at scene changes). In some implementations, key frames are spaced between one and four seconds apart based on scene changes (e.g., if a scene change happens within one to four seconds after the last keyframe, a next keyframe is selected at or near the scene change, but if no scene change occurs in this time span then a key frame is forced at or near four seconds after the last keyframe). Live television optionally uses fixed key frame intervals. In some implementations, switching between live streams will not be as seamless as switching between on-demand streams because fixed key frame intervals are used for live streams and thus the live streams will, in some circumstances, not have corresponding key frames that can be matched up and so some noticeable visual jumps at switch boundaries may occur whereas for on-demand streams (e.g., two streams of the same content with different bitrate), matching keyframes can be identified and the content can be switched over at the matching keyframes to provide a seamless transition between the content at a first bitrate and the content at a second, different, bitrate).

In some implementations, segment size is four seconds for live content, so that only a four second latency will occur for accessing any segment on a client. This starts with a key frame and each segment contains exactly one cluster. In some implementations, live content uses fixed key frame intervals, as compared with on-demand content, which uses variable key frame intervals based on scene changes. This is done in order to reduce latency for live encoding, reducing latency by one second.

In some implementations, the computer system selects the first key frame that occurs in the second media stream after the predicted download time as the transition point. For example, if the predicted download time is ten seconds and a key frame occurs every four seconds, the computer system would select the third key frame. In some implementations, there are many potential key frames within the switching interval, especially on slow connections, but, in some circumstances, there will be only one or perhaps two potential candidate key frames. In some implementations, the transition point is selected based on the download speed (e.g., the rate at which the content is downloading based on the available bandwidth) and the position of the nearest scene change such that switches happen at the point of minimal visual disruption for both fast and slow connections. In some implementations, once the computer system selects the transition point (e.g., key frame) for the transition, the decompressed buffer size is increased to 24 frames and it starts to be filled. In some implementations, at the transition point only N frames are stored in the buffer vs. the target of 24 (best effort objective), in which case a switch can still occur. In some implementations, the buffer size is 3 Mbytes for one frame of 1920×1080 with 12 bits per pixel, 8 bits for luma, and four bits for chroma per frame, while adding 24 extra frames would increase the buffer size to 72 Mbytes of memory allocation (e.g., the buffer size would be increased, as shown in stage 2 in FIG. 4C).

In some implementations, prior to receiving the content-transition indication, the computer system receives (535) the first compressed media stream (e.g., as shown in FIG. 4B), and after selecting the first transition point, the computer system terminates receipt of the first compressed media stream after receiving data corresponding to the first transition point (e.g., as shown in FIG. 4D). In some implementations, after selecting the first transition point, the computer system ceases (537) to generate the first decompressed media stream after first buffered data corresponding to the first transition point has been generated (e.g., as shown in FIG. 4E-4F).

In some implementations, the computer system, after receiving the content-transition indication and prior to ceasing to generate the first decompressed media stream, stores (538) sufficient decompressed media content in the first buffered data to continue providing the first decompressed media stream to the presentation device (from a current playback position) until the first transition point is reached (e.g., a size of the decompressed buffer is temporarily increased while the device is switching from using a first codec to using a second codec, as shown in FIGS. 4C-4D, where the amount of decompressed stream A that is stored in decompressed buffer 412 is increased after the content-transition indication is received).

In some implementations, the first content includes video content that is divided into a first plurality of groups of frames, the second content includes video content that is divided into a second plurality of groups of frames, the first transition point in the first content is selected so as to occur at a boundary of a first group of frames in the first plurality of groups of frames; and (e.g., immediately prior to a next key frame) the second transition point in the second content is selected (539) so as to occur at a boundary of a second group of frames in the second plurality of groups of frames (e.g., a key frame). In some implementations, the first transition point corresponds to an end of a scene in the first decompressed media stream, and the second transition point corresponds (540) to a beginning of a scene in the second decompressed media stream.

In some implementations, the computer system stores (543) first buffered data corresponding to the first decompressed media stream (e.g., decompressed content is stored in decompressed buffer 414 as shown in FIGS. 4A-4I). In some implementations, prior to receiving the content-transition indication, the computer system stores a first amount of decompressed media stream data (e.g., the amount of stream A data depicted in the decompressed buffer 412 during stage 1, as shown in FIG. 4B), and after receiving the content-transition indication, the computer system stores (544) a second amount of decompressed media stream data that is larger than the first amount of decompressed media stream data (e.g., the amount of stream A data depicted in the decompressed buffer 412 during stage 3, as shown in FIG. 4D). In some implementations, in response to receiving the content-transition indication, the device increases the fill level of a fixed-size buffer or increases the size of a variable sized buffer. In some implementations, in response to receiving the content-transition indication, the device adds a supplemental "codec switching" buffer for decompressed media stream data.

In some implementations, the computer system receives (546) a second compressed media stream corresponding to the second decompressed media stream (e.g., the computer system retrieves the second compressed media stream from a second data source 402-B, as part of stage 3 and shown in FIG. 4D). In some implementations, the first compressed media stream and the second compressed media steam correspond (547) to the same source content (e.g., a same video or video channel at different bitrates). In some implementations, the first compressed media stream and the second compressed media steam correspond (548) to different source content (e.g., two different videos or two different channels at the same or different bitrates).

In some implementations, when a first transition point and a second transition point have been selected, after selecting the second transition point, the computer system requests (549) the second compressed media stream starting at the second transition point, and receiving the second compressed media stream corresponding to the second decompressed media stream includes receiving a portion of the second compressed media stream starting at the second transition point (e.g., without receiving a portion of the second compressed media stream prior to the second transition point).

In some implementations, the first compressed media stream is received (550) from a media source (e.g., server 120 or another content source 121). In some implementations, the computer system stores (551) first data corresponding to the first compressed media stream in a first compressed buffer (e.g., compressed stream A data is stored in buffer 410-A as shown in FIGS. 4B-4C). In response to receiving the content-transition indication, the computer system ceases (552) to receive the first compressed media stream from the media source (e.g., as shown by the transition between FIGS. 4C-4D). In some implementations, the computer system continues to generate the first decompressed media stream using the first data stored in the first compressed buffer (e.g., as shown in FIGS. 4D-4E). In some implementations, while continuing to generate (553) the first decompressed media stream using the first data stored in the first compressed buffer, the computer system receives (554) the second compressed media stream (e.g., as shown in FIG. 4D-4E) and stores (555) second data corresponding to the second compressed media stream in a second compressed buffer (e.g., compressed stream B data is stored in buffer 410-B as shown in FIGS. 4E-4F).

In some implementations, after receiving the second compressed media stream, the computer system provides (556) the first buffered data corresponding to the first decompressed media stream to the presentation device while preparing to generate the second decompressed media stream (e.g., as shown in FIGS. 4D-4H where stream A continues to be provided to output device 416 while the device is preparing to generate stream B). In some implementations, while providing the first decompressed media stream to the presentation device, the computer system ceases (557) to generate the first decompressed media stream, and the first buffered data corresponding to the first decompressed media stream is provided to the presentation device after ceasing to generate the first decompressed media stream (e.g., as shown in the transition between FIGS. 4E-4F, the device stops producing decompressed stream A while continuing to provide decompressed stream A to output device 416).

In some implementations, the first decompressed media stream is generated using a first codec, the second decompressed media stream is generated using a second codec, and the computer system provides (559) the first buffered data to the presentation device after the first codec has ceased to decompress the first decompressed media stream and before the second codec has started to decompress the second decompressed media stream (e.g., as shown in FIG. 4F where stream A is provided to output device 416 while neither stream A nor stream B is being decompressed by decoders 410). In some implementations, the computer transitions from stage 4 shown in FIG. 4E to stage 6 shown in stage 4G without passing through stage 5 shown in FIG. 4F. In some implementations, the first decompressed media stream is generated using a first codec, the second decompressed media stream is generated using a second codec, and the computer system provides (560) the first buffered data to the presentation device after the first codec has ceased to decompress the first decompressed media stream and after the second codec has started to decompress the second decompressed media stream (e.g., as shown in FIG. 4G).

In some implementations, the first buffered data is stored in (562) a decompressed buffer (e.g., the decompressed buffer 412 as shown in FIGS. 4A-4I). In some implementations, after the first codec has ceased to decompress the first media stream, the computer system continues (564) to provide the first buffered data to the presentation device (e.g., as shown in FIGS. 4F-4H). The computer system stores (566) second buffered data corresponding to the second decompressed media stream in the decompressed buffer stream (e.g., as shown in the transition between FIGS. 4G-4H) and, in accordance with a determination that an end of the first buffered data has been reached, the computer system starts (568) to provide the second buffered data to the presentation device (e.g., as shown in FIG. 4I).

In some implementations, the first decompressed media stream is generated using a first codec, the second decompressed media stream is generated using a second codec and preparing to generate the second decompressed media stream includes initializing (570) the second codec after the first codec has stopped decompressing compressed media so that no more than one codec is decompressing compressed media at a time (e.g., as shown in FIGS. 4E-4G, decoder 410-A is stopped in FIG. 4F before decoder 410-B is started in FIG. 4G). In some implementations, memory and processing bandwidth limitations make running two codecs simultaneously (or concurrently) inadvisable. For example, a computer system that employs a software based decoder (e.g., when the decoder is specialized software running on a multi-purpose computer processor) does not decompress more than one media stream at a time in order to minimize memory utilization and CPU usage. In some implementations, the computer system employs a hardware decoding system (e.g., some or all of the computer components are designed to perform decoding functions). In some implementations that use a hardware decoder, the hardware decoder is only capable of decoding a single media stream at a time and additional manufacturing time or expense would be required to add one or more additional hardware decoders and/or one or more software decoders to decode a second media stream.

In some implementations, after preparing to generate the second decompressed media stream, the computer system provides (574) the second decompressed media stream to the presentation device instead of providing the first buffered data corresponding to the first decompressed media stream (e.g., as shown in FIG. 4I the computer system provides stream B to output device 416 instead of stream A). In some implementations, the content-transition indication corresponds (576) to a request to display the second decompressed media stream starting at a respective point in the second decompressed media stream (e.g., a particular timestamp in the second decompressed media stream that corresponds to a current timestamp for live media or a stopping timestamp for the first decompressed media stream) and the respective point is within a predefined portion of the second decompressed media stream (e.g., a portion of the second decompressed media stream that is decompressed and decrypted together, such as a "group of pictures"). In some implementations, providing the second decompressed media stream to the presentation device instead of providing the first buffered data corresponding to the first decompressed media stream includes (578) generating (579) the predefined portion of the second decompressed media stream (e.g., by decompressing a corresponding portion of the second compressed media stream), and providing (580) a subset of the predefined portion of the second decompressed media stream, that does not include content prior to the respective point, to the presentation device. In some implementations, one or more frames of the predefined portion of the second decompressed media streams that occur prior to the respective point are discarded (e.g., second stream data that is downloaded but will not be provided).

In some implementations, when a first transition point and a second transition point have been selected, providing the second decompressed media stream to the presentation device instead of providing the first buffered data corresponding to the first decompressed media stream includes ceasing (582) to provide the first content at the first transition point and starting to provide the second content at the second transition point. In some implementations, after generating at least a portion of the second decompressed media stream, the computer system cross fades (584) first content from the first decompressed media stream with second content from the second decompressed media stream. In some implementations, cross fading the first content with the second content includes combining decompressed video and/or audio from the first content and the second content. In some implementations, the decompressed video and/or audio content is combined in accordance with a weighted average of the first content and the second content, where the weighting values are adjusted over time so that the presented content gradually transitions from the first content to the second content over time.

It should be understood that the particular order in which the operations in FIGS. 5A-5I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 500 described above with respect to FIGS. 5A-5I. For example, the compressed media streams, decompressed media streams, generation of decompressed media streams, content-transition indications, transition points, and presentation devices described above with reference to method 500 optionally have one or more of the characteristics of the compressed media streams, decompressed media streams, generation of decompressed media streams, content-transition indications, transition points, and presentation devices described herein with reference to other methods described herein (e.g., method 600). For brevity, these details are not repeated here.

Figure 6:
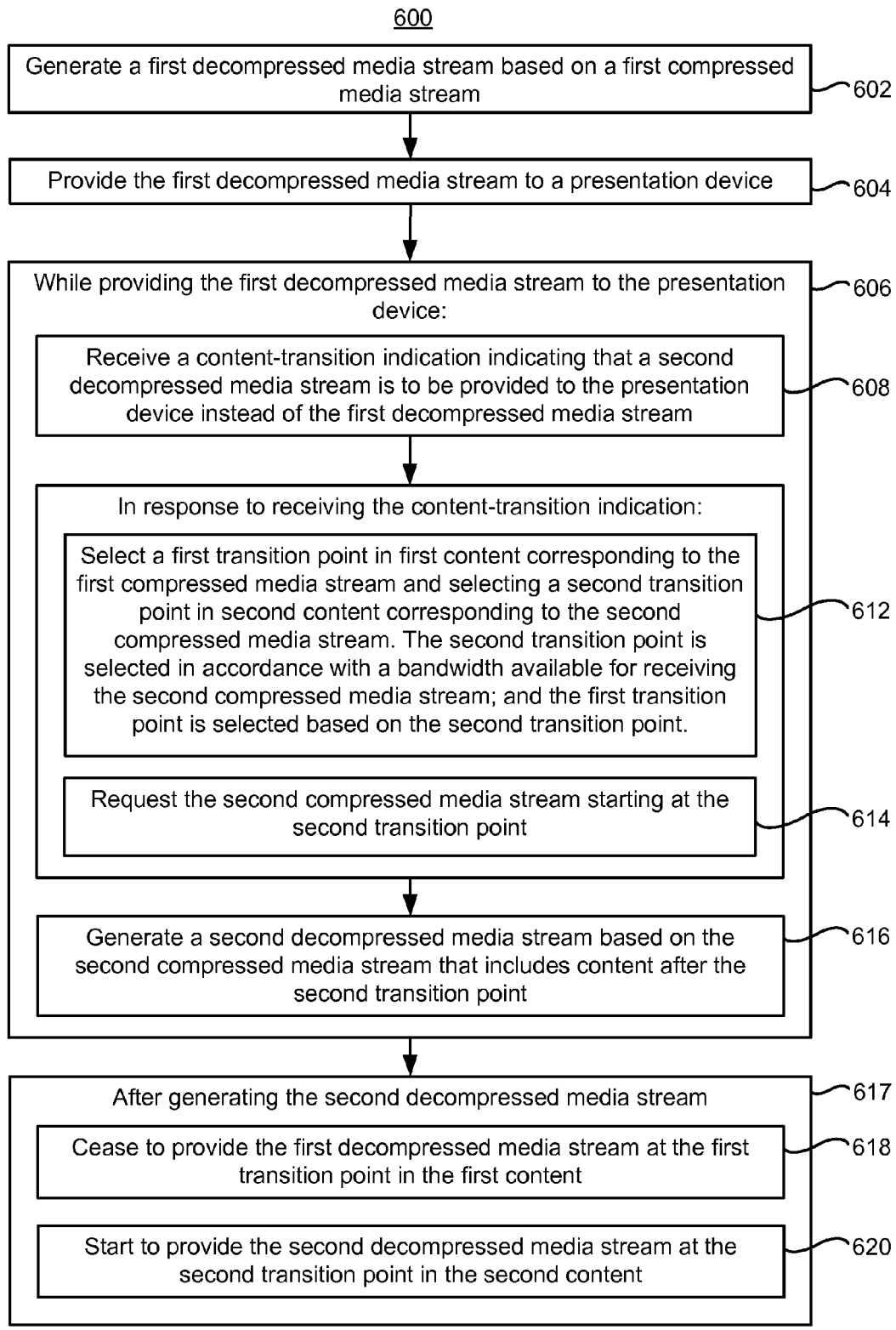
FIG. 6 is a flow diagram illustrating a method of switching from a first video stream to a second video stream, in accordance with some implementations.

FIG. 6 is a flow diagram illustrating a method 600 of switching between a first media stream and a second media stream in accordance with some implementations. The method 600 is performed at a computer system (e.g., device 102 as shown in FIGS. 1 and 2). Some operations in method 600 are, optionally, combined and/or the order of some operations is, optionally, changed.

As described below, the method 600 provides a fast and efficient way to seamlessly transition between media streams. The method reduces the likelihood of interruption or unnecessary delay of the viewing experience when transitioning from a first media stream to a second media stream, thereby creating a better user experience. Furthermore, the method ensures that the transition occurs efficiently, minimizing the power needed and the strain placed on the computing resources of the computer system (e.g. device 102 as shown in FIGS. 1 and 2). For battery-operated electronic devices, enabling efficient and seamless transitions between media streams conserves power and increases the time between battery charges.

In some implementations, the computer system (e.g. device 102 as shown in FIGS. 1 and 2) generates (602) a first decompressed media stream based on a first compressed media stream (e.g., as shown in FIGS. 4A-4I). In some implementations, prior to generating the first decompressed media stream, the device stores a first compressed media stream in a first compressed buffer. In some implementations, the computer system provides (604) the first decompressed media stream to a presentation device (e.g., a device with a display and/or speakers, such as a stand-alone display and/or speaker system such as output device 144 in FIG. 1, output device 210 in FIG. 2, or output device 416 in FIGS. 4A-4I).

In some implementations, while providing (606) the first decompressed media stream to the presentation device, the computer system receives (608) a content-transition indication indicating that a second decompressed media stream is to be provided to the presentation device instead of the first decompressed media stream.

In some implementations, in response to receiving the content-transition indication, the computer system selects (610) a first transition point in first content corresponding to the first compressed media stream and selecting a second transition point in second content corresponding to the second compressed media stream, where the second transition point is selected in accordance with the bandwidth available for receiving the second compressed media stream. In some implementations, the second transition is also selected in accordance with one or more of: a target amount of buffered compressed media, transmission latency, content bit rate, and/or key frame location and the first transition point is selected based on the second transition point.

In some implementations, the computer system requests (614), in response to receiving the content-transition indication, the second compressed media stream starting at the second transition point (e.g., as shown in FIGS. 4B-4I). In some implementations, the computer system generates (616) a second decompressed media stream based on the second compressed media stream that includes content after the second transition point.

In some implementations, after (617) generating the second decompressed media stream, the computer system ceases (618) to provide the first decompressed media stream at the first transition point in the first content (e.g., as shown in FIG. 4I) and starts (620) to provide the second decompressed media stream at the second transition point in the second content (e.g., as shown in FIG. 4I).

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 500) are also applicable in an analogous manner to method 600 described above with respect to FIGS. 5A-5I. For example, the compressed media streams, decompressed media streams, generation of decompressed media streams, content-transition indications, transition points, and presentation devices described above with reference to method 600 optionally have one or more of the characteristics of the compressed media streams, decompressed media streams, generation of decompressed media streams, content-transition indications, transition points, and presentation devices described herein with reference to other methods described herein (e.g., method 500). For brevity, these details are not repeated here.

Plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the implementation(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the implementation(s).

It will also be understood that, although the terms "first," "second," are, in some circumstances, used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
at a computer system including one or more processors and memory:
receiving a first compressed media stream from a media source;
storing first data corresponding to the first compressed media stream in a first compressed buffer;
generating a first decompressed media stream based on the first compressed media stream;
providing the first decompressed media stream to a presentation device;
while providing the first decompressed media stream to the presentation device, receiving a content-transition indication indicating that a second decompressed media stream is to be provided to the presentation device instead of the first decompressed media stream;
in response to receiving the content-transition indication, ceasing to receive the first compressed media stream from the media source;
after ceasing to receive the first compressed media stream from the media source, continuing to provide the first decompressed media stream using the first data stored in the first compressed buffer;
determining a quantity of data of a second compressed media stream for downloading as buffered media, wherein the second compressed media stream corresponds to the second decompressed media stream and the quantity of data is based on:
a target play time of the buffered media;
and a bit rate of the second compressed media stream;
determining a predicted buffering time that it will take to buffer the second compressed media stream based on:
the quantity of data; and
bandwidth available for receiving the second compressed media stream;
selecting a transition point for the second compressed media stream based on the predicted buffering time;
while continuing to provide the first decompressed media stream using the first data stored in the first compressed buffer:
receiving the second compressed media stream corresponding to the second decompressed media stream starting at the transition point; and
storing second data corresponding to the second compressed media stream in a second compressed buffer; and
after storing the second data corresponding to the second compressed media stream in the second compressed buffer, providing the second decompressed media stream, based on the second compressed media stream, to the presentation device instead of providing the first decompressed media stream to the presentation device.

2. The method of claim 1, wherein generating the first decompressed media stream based on the first compressed media stream includes:
receiving the first compressed media stream;
decrypting the first compressed media stream;
demultiplexing the first compressed media stream;
storing decrypted and demultiplexed first compressed media stream data in the first compressed buffer; and
decompressing the first compressed media stream data using a first codec to generate the first decompressed media stream.

3. The method of claim 1, further including:
prior to receiving the content-transition indication, storing a first amount of decompressed media stream data; and
after receiving the content-transition indication, storing a second amount of decompressed media stream data that is larger than the first amount of decompressed media stream data.

4. The method of claim 1, wherein:
the first decompressed media stream is generated using a first codec;
the second decompressed media stream is generated using a second codec; and
the method further includes initializing the second codec after the first codec has stopped decompressing compressed media so that no more than one codec is decompressing compressed media at a time.

5. The method of claim 1, wherein receiving the content-transition indication includes detecting user input selecting a media content affordance associated with requesting presentation of the second decompressed media stream.

6. The method of claim 1, wherein:
receiving the content-transition indication includes detecting a decrease in the bandwidth available for receiving media streams at the computer system;
the method includes transmitting, to a media source, a request for a lower bandwidth version of content corresponding to the first decompressed media stream; and
the second compressed media stream is received in response to the request.

7. The method of claim 1, wherein:
receiving the content-transition indication includes detecting an increase in the bandwidth available for receiving media streams at the computer system;
the method includes transmitting, to a media source, a request for a higher bandwidth version of content corresponding to the first decompressed media stream; and
the second compressed media stream is received in response to the request.

8. The method of claim 1, further including, after generating at least a portion of the second decompressed media stream, cross fading first content from the first decompressed media stream with second content from the second decompressed media stream.

9. The method of claim 1, wherein the first compressed media stream corresponds to source content and the second compressed media stream corresponds to the same source content.

10. The method of claim 1, wherein the first compressed media stream and the second compressed media stream correspond to different source content.

11. The method of claim 1, wherein:
the transition point is a second transition point;
the method further includes, in response to receiving the content-transition indication, selecting a first transition point in first content corresponding to the first compressed media stream; and
providing the second decompressed media stream to the presentation device instead of providing the first decompressed media stream to the presentation device includes ceasing to provide the first content at the first transition point.

12. The method of claim 11, wherein:
the first transition point is selected based on the second transition point.

13. The method of claim 12, further including:
identifying a plurality of candidate transition points in the second compressed media stream;
wherein selecting the transition point based on the predicted buffering time comprises selecting the second transition point from the plurality of candidate transition points.

14. The method of claim 11, wherein:
the method further includes, after selecting the second transition point, requesting the second compressed media stream starting at the second transition point.

15. The method of claim 11, further including:
after selecting the first transition point, terminating receipt of the first compressed media stream after receiving data corresponding to the first transition point.

16. The method of claim 11, wherein:
the first content includes video content that is divided into a first plurality of groups of frames;
the second transition point is selected in second content that includes video content that is divided into a second plurality of groups of frames;
the first transition point in the first content is selected so as to occur at a boundary of a first group of frames in the first plurality of groups of frames; and
the second transition point in the second content is selected so as to occur at a boundary of a second group of frames in the second plurality of groups of frames.

17. The method of claim 16, wherein:
the first transition point corresponds to an end of a scene in the first decompressed media stream; and
the second transition point corresponds to a beginning of a scene in the second decompressed media stream.

18. A computer system, the computer system comprising:
one or more processors; and
memory storing one or more programs for execution by the one or more processors, the one or more programs including instructions for:
receiving a first compressed media stream from a media source;
storing first data corresponding to the first compressed media stream in a first compressed buffer;
generating a first decompressed media stream based on the first compressed media stream;
providing the first decompressed media stream to a presentation device;
while providing the first decompressed media stream to the presentation device, receiving a content-transition indication indicating that a second decompressed media stream is to be provided to the presentation device instead of the first decompressed media stream;
in response to receiving the content-transition indication, ceasing to receive the first compressed media stream from the media source;
after ceasing to receive the first compressed media stream from the media source, continuing to provide the first decompressed media stream using the first data stored in the first compressed buffer;
determining a quantity of data of a second compressed media stream for downloading as buffered media, wherein the second compressed media stream corresponds to the second decompressed media stream and the quantity of data is based on:
a target play time of the buffered media; and
a bit rate of the second compressed media stream;

determining a predicted buffering time that it will take to buffer the second compressed media stream based on:
  the quantity of data; and
  bandwidth available for receiving the second compressed media stream;
selecting a transition point for the second compressed media stream based on the predicted buffering time;
while continuing to provide the first decompressed media stream using the first data stored in the first compressed buffer:
  receiving the second compressed media stream corresponding to the second decompressed media stream starting at the transition point; and
  storing second data corresponding to the second compressed media stream in a second compressed buffer; and
  after storing the second data corresponding to the second compressed media stream in the second compressed buffer, providing the second decompressed media stream, based on the second compressed media stream, to the presentation device instead of providing the first decompressed media stream to the presentation device.

19. A non-transitory computer readable storage medium storing one or more programs, the one or more programs comprising instructions, which when executed by a computer system with one or more processors, cause the computer system to:
  receive a first compressed media stream from a media source;
  store first data corresponding to the first compressed media stream in a first compressed buffer;
  generate a first decompressed media stream based on the first compressed media stream;
  provide the first decompressed media stream to a presentation device;
  while providing the first decompressed media stream to the presentation device, receive a content-transition indication indicating that a second decompressed media stream is to be provided to the presentation device instead of the first decompressed media stream;
  in response to receiving the content-transition indication, cease to receive the first compressed media stream from the media source;
  after ceasing to receive the first compressed media stream from the media source, continue to provide the first decompressed media stream using the first data stored in the first compressed buffer;
  determine a quantity of data of a second compressed media stream for downloading as buffered media, wherein the second compressed media stream corresponds to the second decompressed media stream and the quantity of data is based on:
    a target play time of the buffered media; and
    a bit rate of the second compressed media stream;
  determine a predicted buffering time that it will take to buffer the second compressed media stream based on:
    the quantity of data; and
    bandwidth available for receiving the second compressed media stream;
  select a transition point for the second compressed media stream based on the predicted buffering time;
  while continuing to provide the first decompressed media stream using the first data stored in the first compressed buffer:
    receive the second compressed media stream corresponding to the second decompressed media stream starting at the transition point: and
    store second data corresponding to the second compressed media stream in a second compressed buffer; and
  after storing the second data corresponding to the second compressed media stream in the second compressed buffer, provide the second decompressed media stream, based on the second compressed media stream, to the presentation device instead of providing the first decompressed media stream to the presentation device.

* * * * *